(12) United States Patent
Takami et al.

(10) Patent No.: US 10,720,667 B2
(45) Date of Patent: Jul. 21, 2020

(54) SECONDARY BATTERY, BATTERY PACK, AND VEHICLE

(71) Applicant: KABUSHIKI KAISHA TOSHIBA, Minato-ku (JP)

(72) Inventors: Norio Takami, Yokohama (JP); Kazuomi Yoshima, Yokohama (JP); Hayato Seki, Kawasaki (JP); Shinsuke Matsuno, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/697,709

(22) Filed: Sep. 7, 2017

(65) Prior Publication Data

US 2018/0277899 A1    Sep. 27, 2018

(30) Foreign Application Priority Data

Mar. 22, 2017    (JP) .................................. 2017-056076

(51) Int. Cl.
*H01M 2/10* (2006.01)
*H01M 4/485* (2010.01)
(Continued)

(52) U.S. Cl.
CPC .......... *H01M 10/0568* (2013.01); *B60L 7/10* (2013.01); *B60L 53/22* (2019.02); *B60L 58/10* (2019.02);
(Continued)

(58) Field of Classification Search
CPC .... H01M 2/1077; H01M 2/166; H01M 4/485; H01M 10/054; H01M 10/0562;
(Continued)

(56) References Cited

U.S. PATENT DOCUMENTS 6,403,253 B1    6/2002 Wainwright et al.
6,645,667 B1    11/2003 Iwamoto et al.
(Continued)

FOREIGN PATENT DOCUMENTS

JP    9-508490 A    8/1997
JP    2000-77073 A    3/2000
(Continued)

OTHER PUBLICATIONS

S. Liu, et al., "Rechargeable Aqueous Lithium-Ion Battery of $TiO_2/LiMn_2O_4$ with a High Voltage", Journal of the Electrochemical Society, vol. 158 No. 12, 2011, pp. A1490-A1497.
(Continued)

*Primary Examiner* — Brittany L Raymond
(74) *Attorney, Agent, or Firm* — Oblon, McClelland, Maier & Neustadt, L.L.P.

(57) ABSTRACT

According to one embodiment, a secondary battery including a positive electrode, a negative electrode, a separator, a first electrolyte, and a second electrolyte is provided. The separator is provided at least between the positive electrode and the negative electrode. The separator includes an alkali metal ion conductive solid electrolyte. The first electrolyte is contained in at least the positive electrode. The first electrolyte includes a first alkali metal salt and a first aqueous solvent. The second electrolyte is contained in at least the negative electrode. The second electrolyte includes a second alkali metal salt and a second aqueous solvent.

15 Claims, 8 Drawing Sheets

(51) Int. Cl.
*H01M 10/0562* (2010.01)
*H01M 10/0568* (2010.01)
*H01M 10/42* (2006.01)
*H01M 10/44* (2006.01)
*B60L 7/10* (2006.01)
*H01M 10/054* (2010.01)
*H01M 2/16* (2006.01)
*B60L 53/22* (2019.01)
*B60L 58/10* (2019.01)

(52) U.S. Cl.
CPC ......... *H01M 2/1077* (2013.01); *H01M 2/166* (2013.01); *H01M 4/485* (2013.01); *H01M 10/054* (2013.01); *H01M 10/0562* (2013.01); *H01M 10/425* (2013.01); *H01M 10/441* (2013.01); *H01M 2220/20* (2013.01); *H01M 2300/0068* (2013.01)

(58) Field of Classification Search
CPC ........... H01M 10/0568; H01M 10/425; H01M 10/441; H01M 2220/20; H01M 2300/0002; H01M 2300/0014; H01M 2300/0068; B60L 7/10; B60L 11/1812; B60L 11/1851
See application file for complete search history.

(56) References Cited

U.S. PATENT DOCUMENTS

| | | | | |
|---|---|---|---|---|
| 2002/0197536 | A1* | 12/2002 | Mori | H01M 2/145 429/309 |
| 2009/0087742 | A1 | 4/2009 | Martinet et al. | |
| 2009/0189567 | A1 | 7/2009 | Joshi et al. | |
| 2010/0136427 | A1* | 6/2010 | Kondo | H01M 4/485 429/207 |
| 2011/0274950 | A1 | 11/2011 | Whitacre | |
| 2012/0235644 | A1* | 9/2012 | Gordon | H01M 10/36 320/127 |
| 2012/0264025 | A1* | 10/2012 | Suto | H01M 6/04 429/405 |
| 2014/0287285 | A1* | 9/2014 | Inagaki | H01M 4/485 429/90 |
| 2014/0342209 | A1* | 11/2014 | He | H01M 10/056 429/101 |
| 2014/0356731 | A1 | 12/2014 | Niwa et al. | |
| 2017/0271682 | A1 | 9/2017 | Matsuno et al. | |
| 2017/0271717 | A1 | 9/2017 | Yamashita et al. | |

FOREIGN PATENT DOCUMENTS

| | | |
|---|---|---|
| JP | 2001-206964 A | 7/2001 |
| JP | 2003-17057 A | 1/2003 |
| JP | 2005-71807 A | 3/2005 |
| JP | 2007-513464 A | 5/2007 |
| JP | 2010-56026 A | 3/2010 |
| JP | 5218406 B2 | 6/2013 |
| JP | 5385565 B2 | 1/2014 |
| JP | 5419084 B2 | 2/2014 |
| JP | 6011547 B2 | 10/2016 |
| JP | 2017-33895 A | 2/2017 |
| JP | 2017-174809 A | 9/2017 |
| JP | 2017-174810 A | 9/2017 |
| WO | WO 2015/107423 A2 | 7/2015 |
| WO | WO 2016/114141 A1 | 7/2016 |
| WO | WO 2017/135323 A1 | 8/2017 |

OTHER PUBLICATIONS

Mao-Sung Wu, et al., "Electrochemical Fabrication of Anatase $TiO_2$ Nanostructure as an Anode Material for Aqueous Lithium-Ion Batteries", Journal of Power Sources, vol. 185, 2008, pp. 1420-1424.

* cited by examiner

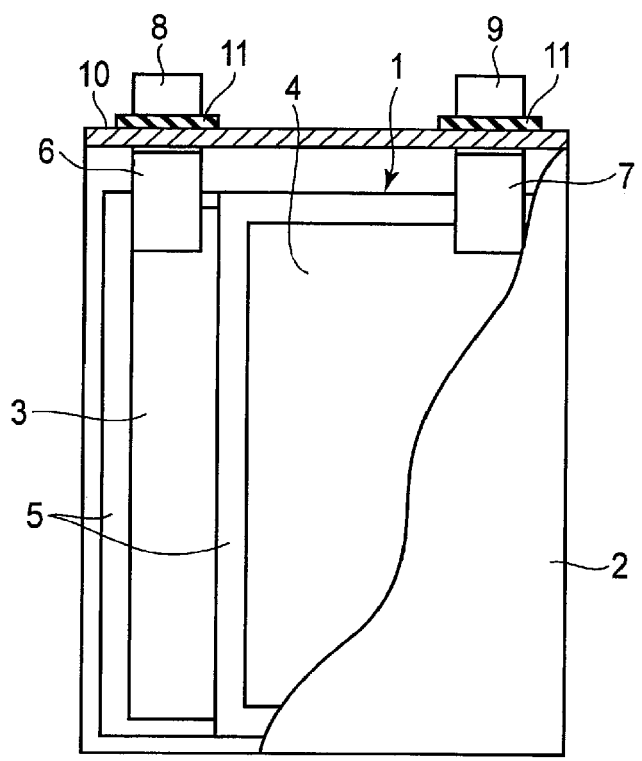
F I G. 1

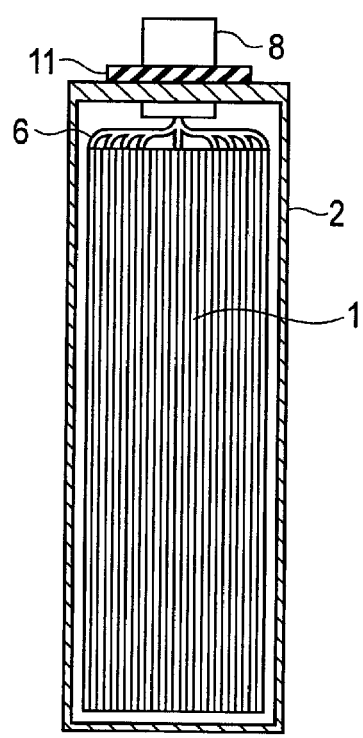
F I G. 2 ably in progress. A lithium-ion secondary battery, which includes a positive electrode including $LiCoO_2$ or $LiMn_2O_4$ as an active material and a negative electrode including a carbonaceous material allowing lithium ions to be inserted and extracted, has been widely put to practical use for a portable device.

On the other hand, when mounted on a vehicle such as an automobile or a train, materials having excellent chemical stability, strength, and corrosion resistance are required as constituent materials of the positive electrode and the negative electrode in terms of storage performance, cycle performance, long-term reliability of high output, and the like under a high temperature environment (60° C. or higher). Furthermore, when high performance is required in cold climates, high output performance and long life performance under a low temperature environment (−40° C.) are required. On the other hand, from the viewpoint of improving safety performance, a nonvolatile nonflammable nonaqueous electrolytic solution has been developed, but it has not yet been put to practical use because it involves a deterioration in output characteristics, low temperature performance, and long life performance.

As described above, when a lithium-ion secondary battery is mounted on a vehicle such as an automobile, high temperature durability and low temperature output performance become issues. For this reason, it is difficult to install and use a lithium-ion secondary battery in an engine room of an automobile as a substitute for a lead storage battery.

Since the electrolytic solution of the lithium-ion secondary battery is used at a high voltage of 2 V to 4.5 V, it is difficult to use an aqueous electrolytic solution. A nonaqueous electrolytic solution, in which a lithium salt is dissolved in an organic solvent, is used as an electrolytic solution for a lithium-ion secondary battery. It has been studied to improve high current performance and cycle life performance by improving the composition of the nonaqueous electrolyte solution. Since the nonaqueous electrolytic solution has lower ion conductivity than the aqueous electrolytic solution, it is difficult to reduce the resistance of the battery. In addition, the organic solvent, which is the solvent of the nonaqueous electrolytic solution, is easily decomposed at a high temperature and has poor thermal stability, causing a deterioration in the high temperature cycle life performance of the battery. From the above, although the use of a solid electrolyte for a nonaqueous electrolyte is studied, a battery having excellent high current performance cannot be obtained because the ion conductivity of the solid electrolyte is lower than that of the nonaqueous electrolytic solution.

On the other hand, a lithium-ion secondary battery including an aqueous solution for the electrolytic solution has low discharge capacity and low cycle life performance due to hydrogen generation from the negative electrode, thus making it difficult to put it into practical use.

SECONDARY BATTERY, BATTERY PACK, AND VEHICLE

CROSS-REFERENCE TO RELATED APPLICATION

This application is based upon and claims the benefit of priority from Japanese Patent Application No. 2017-056076, filed Mar. 22, 2017, the entire contents of which are incorporated herein by reference.

FIELD

Embodiments of the present invention relate to a secondary battery, battery pack and a vehicle.

BACKGROUND

A secondary battery, such as a nonaqueous electrolyte secondary battery, in which a lithium metal, a lithium alloy, a lithium compound, or a carbonaceous material is used as a negative electrode active material, is expected as a high energy density battery, and research and development is

BRIEF DESCRIPTION OF THE DRAWING(S)

FIG. 1 is a partial cutaway cross-sectional view of a secondary battery according to an embodiment;

FIG. 2 is a side view of the battery of FIG. 1;

DETAILED DESCRIPTION

Figure 3:
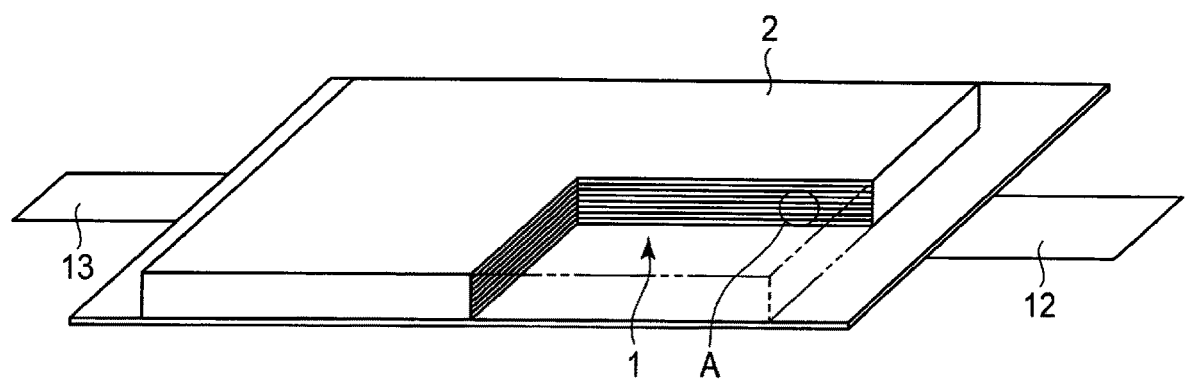
FIG. 3 is a partial cutaway perspective view illustrating a secondary battery according to an embodiment.

According to one embodiment, a secondary battery including a positive electrode, a negative electrode, a separator, a first electrolyte, and a second electrolyte is provided. The separator is provided at least between the positive electrode and the negative electrode. The separator includes an alkali metal ion conductive solid electrolyte. The first electrolyte is contained in at least the positive electrode and includes a first alkali metal salt and a first aqueous solvent. The second electrolyte is contained in at least the negative electrode and includes a second alkali metal salt and a second aqueous solvent.

According to another embodiment, a battery pack including the secondary battery according to the embodiment is provided.

According to another embodiment, a vehicle including the battery pack according to the embodiment is provided.

First Embodiment

According to a first embodiment, a secondary battery including a positive electrode, a negative electrode, a separator, a first electrolyte, and a second electrolyte is provided. The separator is disposed at least between the positive electrode and the negative electrode. The separator includes an alkali metal ion conductive solid electrolyte. The first electrolyte is present in at least the positive electrode. In addition, the first electrolyte includes a first alkali metal salt and a first aqueous solvent. The second electrolyte is present in at least the negative electrode. The second electrolyte includes a second alkali metal salt and a second aqueous solvent.

The alkali metal ion conductive solid electrolyte is an aprotic conductor. Therefore, a proton and an anion cannot penetrate the separator including the solid electrolyte, and the use of this separator prevents OH generated by a reductive decomposition of water at the negative electrode from moving to the positive electrode during charge. As a result, since a pH value of the second electrolyte becomes higher than a pH value of the first electrolyte and a hydrogen generation potential at the negative electrode becomes lower, the coulomb efficiency of the charge and discharge of the negative electrode becomes higher. Since this makes it possible to obtain high discharge capacity in the secondary battery and also significantly improve storage performance (self-discharge performance) and cycle life performance of the secondary battery, it is possible to provide a secondary battery having excellent discharge capacity, high current performance, cycle performance, and storage performance. When the solid electrolyte has one or more kinds of cation conductivities among $Li^+$ conductivity, $Na^+$ conductivity, and $K^+$ conductivity, the high current performance, the cycle performance, or the storage performance is significantly improved.

A water concentration of the second electrolyte can be lowered by making an alkali metal ion concentration of the second electrolyte be equal to or higher than an alkali metal ion concentration of the first electrolyte. As a result, since hydrogen generation at the negative electrode is greatly reduced, it is possible to efficiently insert and extract lithium ions into and from the negative electrode, thereby remarkably improving the cycle life performance and the storage performance. In addition, since the ion conductivity in the negative electrode is high, the resistance at the negative electrode is reduced and the high current performance is improved.

Since one or more kinds of ions selected from the group consisting of $Cl^-$, $OH^-$, $[(FSO_2)_2N]^-$, and $[(CF_3SO_2)_2N]^-$ are included as the anion of the alkali metal salt of the second electrolyte, the alkali metal ion concentration of the aqueous solvent in the second electrolyte can be increased and the water concentration of the second electrolyte can be reduced, thereby suppressing hydrogen generation at the negative electrode. As a result, the coulomb efficiency of charging and discharging of the negative electrode is increased, and the storage performance and the cycle life performance of the secondary battery are significantly improved.

Since one or more kinds of ions selected from the group consisting of $Cl^-$, $NO_3^-$, $CO_3^{2-}$, and $SO_4^{2-}$ are included as the anion of the alkali metal salt of the first electrolyte, the ion conductivity of the first electrolyte is increased and the coulomb efficiency at the positive electrode is improved, thereby improving the cycle life performance and the storage performance of the secondary battery.

Since the negative electrode includes a titanium-containing oxide capable of allowing alkali metal ions to be inserted and extracted, hydrogen generation caused by the reductive decomposition of water at the negative electrode can be greatly suppressed, thereby significantly improving the cycle life and storage performance of the secondary battery.

Since the separator includes a composite of a solid electrolyte and a polymer material, the flexibility of the separator is improved, so that the contact resistance between the separator and the positive electrode and between the separator and the negative electrode is reduced, thereby improving the high current performance of the secondary battery.

Hereinafter, the first electrolyte, the second electrolyte, the negative electrode, the positive electrode, and the separator will be described. The secondary battery according to the embodiment may include a container which is a container member, and the container will also be described.

1) First Electrolyte (Electrolyte A)

The first electrolyte is present in at least the positive electrode. The first electrolyte is, for example, an aqueous solution including a first alkali metal salt and a first aqueous solvent in which the first alkali metal salt is dissolved. The first electrolyte may be present in at least one of the negative electrode and the separator, as well as the positive electrode.

The first aqueous solvent is a solvent including water and may include water alone, or water and a solvent other than water. Examples of the solvent other than water include a water-soluble organic solvent. Examples of the water-soluble organic solvent include γ-butyrolactone, acetonitrile, alcohols, N-methylpyrrolidone (NMP), dimethylacetamide, dimethylsulfoxide, tetrahydrofuran, and the like. The kind of the solvent included in the first aqueous solvent can be one kind or two or more kinds. The content of the solvent other than water in the first aqueous solvent is preferably 20% by weight or less.

The first alkali metal salt is, for example, salts of one or more kinds of alkali metals selected from the group consisting of Li, Na, and K. Since each of Li, Na, and K is excellent in ion conductivity, the ion conductivity of the first electrolyte can be increased. The kind of the salt of the first alkali metal can be one kind or two or more kinds. A more preferable ion of the alkali metal is $Li^+$. $Li^+$ can be obtained by dissolving a lithium salt in an aqueous solvent.

In the first electrolyte, the concentration of the alkali metal ion in the aqueous solvent is preferably 1 mol/L to 8 mol/L. Due to this, the first electrolyte having excellent ion conductivity can be obtained. The concentration is preferably 1.5 mol/L or more. Or, the concentration is preferably 6 mol/L or less. By further specifying the upper limit or the lower limit, the ion conductivity of the first electrolyte is increased and the reaction resistance at the positive electrode is reduced, thereby improving the high current performance. A more preferable concentration is 1 mol/L to 6 mol/L. A further more preferable concentration is 1.5 mol/L to 6 mol/L. Within this range, the ion conductivity of the first electrolyte is increased and the reaction resistance at the positive electrode is reduced, thereby improving the high current performance.

The first alkali metal salt is, for example, a lithium salt. Examples of the lithium salt include LiCl, LiBr, LiOH, $Li_2SO_4$, $LiNO_3$, $Li_2C_2O_4$, $Li_2CO_3$, $Li[(FSO_2)_2N]$, $Li[(CF_3SO_2)_2N]$, $LiB[(OCO)_2]_2$, and the like. The kind of the lithium salt used can be one kind or two or more kinds. A lithium salt including LiCl, $LiNO_3$, $Li_2CO_3$, or $Li_2SO_4$ is preferred. LiCl is excellent in solubility in an aqueous solvent even if generation of $Cl_2$ during charge is feared. Each of $Li_2SO_4$ and $LiNO_3$ is not high in solubility in an aqueous solvent, but contributes to an improvement in high current performance and cycle life performance.

The anion of the first alkali metal salt includes, for example, one or more kinds of anions selected from the group consisting of $Cl^-$, $Br^-$, $OH^-$, $SO_4^{2-}$, $NO_3^-$, $C_2O_4^{2-}$, $CO_3^{2-}$, $[(FSO_2)_2N]^-$, $[(CF_3SO_2)_2N]^-$, and $B[(OCO)_2]_2^-$. A preferable anion includes one or more kinds of ions selected from the group consisting of $Cl^-$, $NO_3^-$, $CO_3^{2-}$, and $SO_4^-$. Due to this, the coulomb efficiency at the positive electrode is improved, and thus, the cycle life performance and storage performance of the secondary battery are improved.

It is preferable that a pH value of the first electrolyte is in a range of 1 to 8. Within this range, an oxygen generation potential is increased and oxygen generation is reduced, thereby significantly improving the storage performance and the cycle life performance of the positive electrode. A more preferable range of the pH value is 3 to 7.5.

The first electrolyte may be a gel-like electrolyte including a composite of an alkali metal salt and a polymer material (first polymer material). Due to this, diffusion of water molecules from the first electrolyte to the negative electrode can be suppressed, and hydrogen generation at the negative electrode can be greatly suppressed, thereby significantly improving the cycle life performance and the storage performance of the secondary battery. The composite is, for example, a gel-like electrolyte in which an aqueous solution in which an alkali metal salt is dissolved in an aqueous solvent and a polymer material are gelled by combination. Examples of the first polymer material include, for example, a polyacrylic acid salt (for example, lithium polyacrylate, potassium polyacrylate, or the like), polyvinylidene fluoride (PVdF), polyacrylonitrile (PAN), polyethylene oxide (PEO), and the like. The kind of the polymer material can be one kind or two or more kinds. The form of the polymer material can be, for example, granular or fibrous.

The content of the first polymer material in the first electrolyte can be in a range of 0.5 wt % to 10 wt %.

2) Second Electrolyte (Electrolyte B)

The second electrolyte is present in at least the negative electrode. The second electrolyte is, for example, an aqueous solution including a second alkali metal salt and a second aqueous solvent in which the second alkali metal salt is dissolved. The second electrolyte may be present in at least one of the positive electrode and the separator, as well as the negative electrode.

The second aqueous solvent is a solvent including water and may include water alone, or water and a solvent other than water. Examples of the solvent other than water include a water-soluble organic solvent. Examples of the water-soluble organic solvent include γ-butyrolactone, acetonitrile, alcohols, N-methylpyrrolidone (NMP), dimethylacetamide, dimethylsulfoxide, tetrahydrofuran, and the like. The kind of the solvent included in the second aqueous solvent can be one kind or two or more kinds. The content of the solvent other than water in the second aqueous solvent is preferably 20% by weight or less.

The second alkali metal salt is, for example, salts of one or more kinds of alkali metals selected from the group consisting of Li, Na, and K. Since each of Li, Na, and K is excellent in ion conductivity, the ion conductivity of the second electrolyte can be increased. The kind of the salt of the second alkali metal can be one kind or two or more kinds. A more preferable ion of the alkali metal is $Li^+$. $Li^+$ can be obtained by dissolving a lithium salt in an aqueous solvent.

In the second electrolyte, the concentration of the alkali metal ion in the aqueous solvent is preferably 1 mol/L to 12 mol/L. By increasing the concentration of the alkali metal ions, free water molecules in the second electrolyte are reduced, thereby suppressing hydrogen generation. A preferable range of the lower limit of the concentration is 4 mol/L or more, and a more preferable range thereof is 5 mol/L or more. A more preferable range of the upper limit of the concentration is 10 mol/L or less.

The second alkali metal salt is, for example, a lithium salt. Examples of the lithium salt include LiCl, LiBr, LiOH, $Li_2SO_4$, $LiNO_3$, $Li_2C_2O_4$, $Li_2CO_3$, $Li[(FSO_2)_2N]$, $Li[(CF_3SO_2)_2N]$, $LiB[(OCO)_2]_2$, and the like. The kind of the lithium salt used can be one kind or two or more kinds. A lithium salt including LiCl, LiOH, $Li[(FSO_2)_2N]$, or $Li[(CF_3SO_2)_2N]$ is preferred.

Since $Li[(FSO_2)_2N]$ can be dissolved in an aqueous solvent at a high concentration (for example, 8 mol/L), a ratio of a molar number M2 of water to a molar number M1 of lithium ions of $Li[(FSO_2)_2N]$ (M2/M1) is preferably in a range of 1 to 5. Within this range, hydrogen generation caused by the reductive decomposition of water can be greatly suppressed, thereby improving the cycle life and the storage performance. This is considered that free water molecules are reduced by the increase in the concentration of lithium ions in the aqueous solution and hydrogen generation can be suppressed.

The anion of the second alkali metal salt includes, for example, one or more kinds of anions selected from the group consisting of $Cl^-$, $Br^-$, $OH^-$, $SO_4^{2-}$, $NO_3^-$, $C_2O_4^{2-}$, $CO_3^{2-}$, $[(FSO_2)_2N]^-$, $[(CF_3SO_2)_2N]^-$, and $B[(OCO)_2]_2^-$. A preferable anion includes one or more kinds of ions selected from the group consisting of $Cl^-$, $OH^-$, $[(FSO_2)_2N]^-$, and $[(CF_3SO_2)_2N]^-$. Due to this, since the concentration of alkali metal ions can be increased, hydrogen generation at the negative electrode can be suppressed, and the coulomb efficiency of charging and discharging of the negative electrode is increased, thereby significantly improving the storage performance and the cycle life performance.

It is preferable that a pH value of the second electrolyte is in a range of 3 to 14. Within this range, since the hydrogen generation potential at the negative electrode is lowered, hydrogen generation is suppressed. Therefore, the storage performance and the cycle life performance of the negative electrode are improved.

The second electrolyte may be a gel-like electrolyte including a composite of a second alkali metal salt and a polymer material (second polymer material). Due to this, diffusion of water molecules from the second electrolyte to the negative electrode can be suppressed, and hydrogen generation at the negative electrode can be greatly suppressed, thereby significantly improving the cycle life performance and the storage performance of the secondary battery. The composite is, for example, a gel-like electrolyte in which an aqueous solution in which a second alkali metal salt is dissolved in a second aqueous solvent and a polymer material are gelled by combination. Examples of the second polymer material include, for example, a polyacrylic acid salt (for example, lithium polyacrylate, potassium polyacrylate, or the like), polyvinylidene fluoride (PVdF), polyacrylonitrile (PAN), polyethylene oxide (PEO), and the like. The kind of the polymer material can be one kind or two or more kinds. The form of the polymer material can be, for example, granular or fibrous.

The content of the second polymer material in the second electrolyte can be in a range of 0.5 wt % to 10 wt %.

The type of the anion (referred to as a first anion) of the first alkali metal salt included in the first electrolyte and the type of the anion (referred to as a second anion) of the second alkali metal salt included in the second electrolyte may be identical to or different from each other. By using one or more kinds of ions selected from the group consisting of $Cl^-$, $NO_3^-$, $CO_3^{2-}$, and $SO_4^{2-}$ as the first anion and using one or more kinds of ions selected from $Cl^-$, OH, $[(FSO_2)_2N]^-$, and $[(CF_3SO_2)_2N]^-$ as the second anion, the coulomb efficiency at the positive electrode is improved and the hydrogen generation at the negative electrode is suppressed, thereby improving the storage performance and the cycle life performance of the secondary battery.

A method of measuring pH of the first electrolyte and the second electrolyte is as follows.

After discharging the secondary battery, this battery is disassembled to take out an electrode group. Each of the electrolytes (electrolytic solutions) in the positive electrode and the negative electrode is extracted, a liquid amount is measured, and a pH value is measured with a pH meter. The pH measurement is performed, for example, as follows. For this measurement, for example, F-74 manufactured by Horiba Seisakusho Co., Ltd. is used. First, standard solutions with pH 4.0, 7.0, and 9.0 are prepared. Subsequently, the calibration of F-74 is performed by using these standard solutions. The electrolyte (electrolytic solution) to be measured is adjusted in an appropriate amount and put into the container, and pH is measured. After the pH measurement, a sensor unit of F-74 is washed. When measuring another measuring object, the above-described procedures, that is, the calibration, the measurement, and the washing are performed each time.

It is preferable that each of the first electrolyte and the second electrolyte has a solvent amount (for example, an amount of water in an aqueous solvent) of 1 mol or more with respect to 1 mol of a salt serving as a solute. In a further preferred embodiment, the solvent amount with respect to 1 mol of the salt serving as the solute is 3.5 mol or more.

Whether or not water is included in each of the first electrolyte and the second electrolyte can be confirmed by Gas Chromatography-Mass Spectrometry (GC-MS) measurement. In addition, the calculation of the salt concentration and the water content in each of the first electrolyte and the second electrolyte can be measured by, for example, Inductively Coupled Plasma (ICP) emission spectrometry or the like. A molar concentration (mol/L) can be calculated by weighting a specified amount of each electrolyte and calculating a contained salt concentration. In addition, the number of moles of the solute and the solvent can be calculated by measuring a specific gravity of each electrolyte.

Each of the first electrolyte and the second electrolyte can include both lithium ions and sodium ions.

2) Negative Electrode

The negative electrode includes a negative electrode current collector and a negative electrode active material-containing layer which is supported on one side or both sides of the current collector and includes an active material and, if necessary, a conductive agent and a binder.

A foil, a porous body, or a mesh, which is made of a metal such as zinc, nickel, stainless steel, iron, copper, aluminum, or titanium, is preferably used as the negative electrode current collector. A material component of the negative electrode current collector can be one kind or two or more kinds. It is preferable that at least a part of the surface of the negative electrode current collector including the at least one metal selected from the above-mentioned kinds is covered with a metal oxide layer by oxidation treatment. In addition, a foil made of galvanized aluminum, iron, stainless steel, or nickel is preferable.

A thickness of the negative electrode current collector is preferably in a range of 5 µm to 20 µm.

As the negative electrode active material, negative electrode active material particles capable of allowing lithium ions to be inserted and extracted can be used. It is desirable that an insertion/extraction potential of the lithium ions of the negative electrode active material is in a range of 0.2 to 3 V (vs. Li/Li$^+$) based on a Li potential. Examples of the negative electrode active material include a lithium alloy, a carbon material, lithium titanium oxide, titanium oxide, titanium niobium oxide (for example, $TiNb_2O_7$), and lithium sodium niobium titanium oxide. The kind of the negative electrode active material used can be one kind or two or more kinds.

It is preferable that the negative electrode active material includes one kind or two or more kinds of titanium-containing oxides. By using the titanium-containing oxide, aluminum foil instead of copper foil can be used for the negative electrode current collector. As a result, since aluminum can be used for both the negative electrode current collector and the positive electrode current collector, weight reduction and cost reduction of the secondary battery can be realized. In addition, the use of the titanium-containing oxide is advantageous for an electrode structure of a bipolar structure. The titanium-containing oxide is capable of allowing Na$^+$ ions to be inserted and extracted. Examples of titanium-containing oxides include lithium titanium oxide, titanium oxide, niobium titanium oxide, and sodium niobium titanium oxide.

Examples of the lithium titanium oxide include lithium titanium oxide having a spinel structure (for example, $Li_{4+x}Ti_5O_{12}$ ($-1 \leq x \leq 3$)), lithium titanium oxide having a ramsdellite structure (for example, $Li_{2+x}Ti_3O_7$ ($-1 \leq x \leq 3$), $Li_{1+x}Ti_2O_4$ ($0 \leq x \leq 1$), $Li_{1.1+x}Ti_{1.8}O_4$ ($0 \leq x \leq 1$), $Li_{1.07+x}Ti_{1.86}O_4$ ($0 \leq x \leq 1$), and $Li_xTiO_2$ ($0 < x \leq 1$).

Examples of the titanium oxide include titanium oxide having a monoclinic structure, titanium oxide having a rutile structure, and titanium oxide having an anatase structure. In the titanium oxide of each crystal structure, a composition before charge can be represented by $TiO_2$, and a composition after charge can be represented by $Li_xTiO_2$ ($0 \leq x \leq 1$). In addition, the structure of the titanium oxide having the monoclinic structure before charge can be represented by $TiO_2(B)$.

Examples of the niobium-titanium oxide include a material represented by $Li_aTiM_bNb_{2\pm\beta}O_{7\pm\sigma}$ ($0 \leq a \leq 5$, $0 \leq b \leq 0.3$, $0 \leq \beta \leq 0.3$, $0 \leq \sigma \leq 0.3$, and M is at least one element selected from the group consisting of Fe, V, Mo, and Ta).

Examples of the sodium niobium titanium oxide include orthorhombic Na-containing niobium titanium composite oxide represented by general formula of $Li_{2+v}Na_{2-w}M1_xTi_{6-y-z}Nb_yM2_zO_{14+\delta}$ ($0 \leq v \leq 4$, $0 < w < 2$, $0 \leq x < 2$, $0 < y \leq 6$, $0 \leq z < 3$, $-0.5 \leq \delta \leq 0.5$, $0 < (6-y-z) < 6$, M1 includes at least one selected from Cs, K, Sr, Ba, and Ca, and M2 includes at least one selected from Zr, Sn, V, Ta, Mo, W, Fe, Co, Mn, and Al).

Since the titanium-containing oxide having the above composition has a lithium ion insertion/extraction potential range of 1.4 to 2 V (vs. Li/Li$^+$), it is possible to efficiently insert and extract lithium ions by combination with the first and second electrolytes.

Preferred titanium-containing oxides include lithium titanium oxide having a spinel structure. The lithium titanium oxide having the spinel structure can reduce a volume change due to a charge-and-discharge reaction.

The negative electrode active material is included in the negative electrode active material-containing layer in the form of particles. The negative electrode active material particles may be single primary particles, secondary particles in which the primary particles are aggregated, or a mixture of single primary particles and secondary particles. The shape of the particle is not particularly limited, and may be, for example, a spherical, elliptical, flat, or fibrous shape, and the like.

An average particle size (diameter) of the secondary particles of the negative electrode active material is preferably not smaller than 5 µm. The average particle size of the secondary particles is more preferably 7 μm to 20 μm. Within this range, the effect of suppressing hydrogen generation can be enhanced.

A negative electrode active material, of which an average particle size of secondary particles of 5 μm or more, can be obtained, for example, by the following method. After reaction synthesis is performed on an active material source to prepare an active material precursor having an average particle size of 1 μm or less, heat treatment is performed, and pulverization treatment is performed by using a pulverizer such as a ball mill or a jet mill. Then in the heating process, the active material precursor is aggregated to grow into secondary particles having a large particle size.

The average particle size of the primary particles of the negative electrode active material is preferably set to be 1 μm or less. Due to this, a diffusion distance of ions inside the active material is shortened and a specific surface area is increased. Therefore, excellent high input performance (quick charge) can be obtained. The lower limit of the average particle size can be set to be 0.001 μm. A more preferable average particle size is 0.1 μm to 0.8 μm.

In the negative electrode active material particles, it is preferable that an average primary particle size is 1 μm or less and a specific surface area in a BET method by $N_2$ adsorption is 3 $m^2$/g to 200 $m^2$/g. The reason for specifying the specific surface area within the above range will be explained. That the specific surface area is set to be 3 $m^2$/g or more is preferable for suppressing hydrogen generation from the negative electrode and also contributes to the suppression of interfacial resistance of the negative electrode, thereby improving the output characteristics and charge-and-discharge cycle characteristics. In addition, by setting the specific surface area to be 200 $m^2$/g or less, the amount of the binder included in the negative electrode active material-containing layer can be reduced and a high electrode density can be obtained, thereby improving capacity and suppressing an increase in resistance. A more preferable range of the specific surface area is 15 $m^2$/g to 150 $m^2$/g.

Preferably, at least a part of the surface of the negative electrode active material particle such as the titanium-containing oxide particle is covered with a coating material including at least one element (hereinafter, referred to as a first element) selected from the group consisting of B, P, Al, La, Zr, Ge, Ti, Zn, Sn, Ga, Pb, In, Bi, and Tl, first element-containing particles are mixed with negative electrode active material particles, or both the coating and the mixing are performed. Due to this, it is possible to allow ions to be smoothly inserted and extracted while significantly suppressing hydrogen generation, and it is possible to enhance the high current performance of the battery. Elements such as Ga, In, Bi, Tl, Sn, Pb, Al, Zn, and Ti are excellent in a function of raising a hydrogen generation overvoltage. The particles may be primary particles, secondary particles, or a mixture of secondary particles and primary particles. Each element may be in the form of a simple substance, a compound, or an alloy. Each element can exist in the negative electrode in multiple forms such as a simple substance and a compound.

In the case of mixing the first element-containing particles with the negative electrode active material particles, it is preferable that the mixing ratio satisfies the following formula (1).

$$2 \text{ wt \%} \leq \{W_1/W_2\} \times 100 \leq 50 \text{ wt \%} \quad (1)$$

In the formula (1), $W_1$ is a weight of the first element-containing particle and $W_2$ is a weight of the negative electrode active material particle. In a case where the surface of the titanium-containing oxide particles is coated with the coating material, $W_2$ is a total weight of the titanium-containing oxide particles and the coating material.

By setting the weight ratio of the first element to be 2 wt % to 50% weight, electron conductivity in the negative electrode is improved and hydrogen generation is significantly suppressed, whereby insertion and extraction of lithium ions can smoothly proceed and the high current performance of the battery can be enhanced. A more preferable range of the weight ratio is 3 wt % to 30 wt %. A weight ratio of the first element is measured by the following method. The secondary battery is disassembled in a glove box filled with argon and the negative electrode is extracted. The negative electrode active material-containing layer is separated from the negative electrode current collector of the extracted negative electrode. After the negative electrode active material-containing layer is washed with water or a neutral aqueous solution and is dried, the first element and the negative electrode active material are separated by using a difference in specific gravity between the first element and the negative electrode active material. The separation is performed by a method of putting a mixed powder to an organic solvent and separating the first element and the negative electrode active material from a difference in sedimentation rate, or a method of separating the first element and the negative electrode active material in a dry gravity separation apparatus. The weight of each of the first element and the negative electrode active material is measured, and the weight ratio of the first element is calculated from the formula (1).

Examples of the compound of the first element include an oxide of the first element and a hydroxide of the first element. As the oxide of the first element, a solid electrolyte having no electron conductivity and having ion conductivity, zinc oxide (for example, ZnO or $ZnO_2$), alumina (for example, $Al_2O_3$), zirconia (for example, $ZrO_2$), boron oxide (for example, $B_2O_3$), titanium oxide (for example, TiO or $TiO_2$), and the like. Zinc oxide can suppress hydrogen generation, and cycle life performance and storage performance are improved. A coating material including zinc oxide is preferred.

Examples of the solid electrolyte include an oxide solid electrolyte which is stable in an aqueous solution and has high lithium ion conductivity. An oxide solid electrolyte having a NASICON type structure is chemically stable in an aqueous solution, has high reduction resistance, and has a wide electrochemical window. Examples of the oxide solid electrolyte having the NASICON type structure include $Li_{1.3}Ti_{1.7}Al_{0.3}(PO_4)_3$. In addition, examples of an oxide solid electrolyte having a γ-$Li_3PO_4$ type structure include $Li_{14}ZnGe_4O_{16}$ and $Li_{3.6}Ge_{0.6}V_{0.4}O_4$.

Examples of the alloy of the first element include a Zn-containing alloy, a Bi—In—Pb based alloy, a Bi—In—Ca based alloy, and a Bi—In—Al based alloy. According to these alloys, a hydrogen generation overvoltage can be increased.

It is preferable that the coating material includes a Zn component. Since the coating material including the Zn component has a large hydrogen overvoltage and functions as a negative electrode active material, hydrogen generation can be suppressed and a high-capacity negative electrode can be realized. In addition, since metallic zinc is excellent in electron conductivity, it can also serve as a conductive agent, and the electron conductivity of the negative electrode can be enhanced. Examples of the Zn component include a zinc metal (zinc itself), a zinc compound, and a zinc-containing alloy. Examples of the zinc compound include zinc oxide (for example, ZnO or $ZnO_2$), hydrate ion of zinc, zinc hydroxide ($Zn(OH)_2$), zincate ion ($ZnO_2^{2-}$), and the like. In a case where the coating material includes a zinc metal, the zinc metal can be changed to zinc oxide (for example, ZnO or $ZnO_2$) by a charge-and-discharge reaction. The negative electrode active material particles are preferably coated with zinc (Zn), zinc oxide (for example, ZnO), or zinc hydroxide ($Zn(OH)_2$). This makes it possible to increase the hydrogen overvoltage, thereby improving the cycle life of the secondary battery.

The coating material can take the form of layer, granule, membrane, fiber, and the like.

It is preferable that a thickness of the coating material is 0.05 μm to 0.5 μm. By setting the thickness to be 0.05 μm or more, it is possible to suppress hydrogen generation and improve the life performance. In addition, by setting the thickness to be 0.5 μm or less, it is possible to reduce the negative electrode resistance and improve the high current performance. A preferable range of the thickness of the coating material is 0.06 μm to 0.3 μm. The thickness of the coating material can be measured by observation with a scanning electron microscope (SEM) or a transmission electron microscope (TEM).

As a method of coating at least a part of the surface of the titanium-containing oxide particle, there is a method of adding a single substance, an alloy, or a compound of the first element to the negative electrode, or dissolving a salt of the first element in the first or second electrolyte. In addition, other coating methods include plating, vapor deposition, and the like.

A porosity of the negative electrode (excluding the current collector) is preferably in a range of 20 to 50%. Due to this, it is possible to obtain a high density negative electrode which is excellent in affinity between the negative electrode and the first and second electrolytes. A more preferable range of the porosity is 25 to 40%.

A density of the negative electrode can be in a range of 2 $g/cm^3$ to 3 $g/cm^3$.

Examples of the conductive agent include carbon materials such as an acetylene black, a carbon black, a coke, a carbon fiber, and graphite, or metal powders of nickel, zinc, or the like. The kind of the conductive agent can be one kind or two or more kinds. Since the carbon material may generate hydrogen from itself, it is preferable to use a metal powder as the conductive agent. When zinc particles are used as the first element, the zinc particles also serve as a conductive agent. Thus, the conductive agent is unnecessary. In addition, the zinc particles function as a negative electrode active material. Therefore, when the zinc particles are used as the first element, hydrogen generation is suppressed, and a negative electrode with high electron conductivity and high capacity can be realized.

Examples of the binder include polytetrafluoroethylene (PTFE), a fluorine-based rubber, a styrene-butadiene rubber, a core-shell binder, and the like. The kind of the binder can be one kind or two or more kinds.

A compounding ratio of the negative electrode active material, the conductive agent, and the binder is preferably in a range of 80 to 95 wt % of the negative electrode active material, 3 to 18 wt % of the conductive agent, and 2 to 7 wt % of the binder.

The negative electrode is prepared, for example, by suspending a negative electrode active material, a conductive agent, and a binder in an appropriate solvent, coating the suspension on a current collector, drying the suspension, and performing a press such as a hot press.

4) Positive Electrode

The positive electrode includes a positive electrode current collector and a positive electrode active material-containing layer which is supported on one side or both sides of the current collector and includes an active material and, if necessary, a conductive agent and a binder.

A foil, a porous body, or a mesh, which is made of a metal such as nickel, stainless steel, iron, or copper, is preferably used as the positive electrode current collector.

Examples of the positive electrode active material include lithium manganese composite oxide, lithium nickel composite oxide, lithium cobalt aluminum composite oxide, lithium nickel cobalt manganese composite oxide, spinel type lithium manganese nickel composite oxide, lithium manganese cobalt composite oxide, olivine type lithium iron phosphate (for example, $LiFePO_4$), olivine type lithium manganese phosphate (for example, $LiMnPO_4$), and the like.

Examples of the positive electrode active material, from which a high voltage can be obtained, include lithium manganese composite oxide such as $Li_xMn_2O_4$ ($0<x\leq1$) or $Li_xMnO_2$ ($0<x\leq1$), $Li_xNi_{1-y}Al_yO_2$ ($0<x\leq1$, $0<y\leq1$), lithium nickel aluminum composite oxide such as $Li_xNi_{1-y}Al_yO_2$ ($0<x\leq1$, $0<y\leq1$), lithium cobalt composite oxide such as $Li_xNi_{1-y}Al_yO_2$ ($0<x\leq1$), lithium nickel cobalt composite oxide such as $Li_xNi_{1-y-z}Co_yMn_zO_2$ ($0<x\leq1$, $0<y\leq1$, $0\leq z\leq1$, $0<1-y-z<1$), lithium manganese cobalt composite oxide such as $Li_xMn_yCo_{1-y}O_2$ ($0<x\leq1$, $0<y\leq1$), a spinel-type lithium manganese nickel composite oxide such as $Li_xMn_{2-y}NiO_4$ ($0<x\leq1$, $0<y<2$), lithium phosphate having an olivine structure such as $Li_xFePO_4$ ($0<x\leq1$). $Li_xFe_{1-y}Mn_yPO_4$ ($0<x\leq1$, $0\leq y\leq1$), or $Li_xCoPO_4$ ($0<x\leq1$), and fluorinated iron sulfate (for example, $Li_xFeSO_4F$ ($0<x\leq1$)).

According to the lithium nickel aluminum composite oxide, the lithium nickel cobalt manganese composite oxide, and the lithium manganese cobalt composite oxide, the reaction with the electrolyte in a high temperature environment can be suppressed, and the battery life can be significantly improved. The composite oxide represented by $Li_xNi_{1-y-z}Co_yMn_zO_2$ ($0\leq x\leq1.1$, $0\leq y\leq0.5$, $0\leq z\leq0.5$, more preferably $0<x\leq1.1$, $0<y\leq0.5$, $0<z\leq0.5$) is advantageous for high temperature durability life.

A lithium phosphorus oxide having an olivine structure and a lithium manganese composite oxide having a spinel structure (for example, $Li_xMn_2O_4$ ($0<x\leq1$)) are preferred positive electrode active materials because of their high stability to aqueous solvents.

The positive electrode active material particles may include single primary particles, secondary particles which are an aggregate of primary particles, or both single primary particles and secondary particles.

An average particle size (diameter) of the primary particles of the positive electrode active material is 1 μm or less, more preferably 0.05 to 0.5 μm. It is preferable that at least a part of the particle surface of the positive electrode active material is covered with a carbon material. The carbon material may take the form of a layer structure, a particle structure, or an aggregate of particles.

An average secondary particle size of the positive electrode active material can be in a range of, for example, 3 μm to 20 μm.

Examples of the conductive agent for increasing the electron conductivity and suppressing the contact resistance with the current collector can include acetylene black, carbon black, graphite, and the like. The kind of the conductive agent can be one kind or two or more kinds.

Examples of the binder for binding the active material and the conductive agent include polytetrafluoroethylene (PTFE) and fluorine-based rubber. The kind of the binder can be one kind or two or more kinds.

In the compounding ratios of the positive electrode active material, the conductive agent, and binder, it is preferable that the positive electrode active material is in a range of 80 wt % to 95 wt %, the conductive agent is in a range of 3 wt % to 18 wt %, and the binder is in a range of 2 wt % to 7 wt %. Since the content of the conductive agent is 3 wt % or more, the effect described above can be exerted. When the content of the conductive agent is 18 wt % or less, decomposition of the electrolyte on the surface of the conductive agent can be reduced when high temperature is maintained. When the content of the binder is 2 wt % or more, the sufficient electrode strength is obtained, and when the content of the binder is 7 wt % or less, the insulating portion of the electrode can be reduced.

A density of the positive electrode can be in a range of 2.5 $g/cm^3$ to 3.5 $g/cm^3$.

The positive electrode is prepared, for example, by suspending a positive electrode active material, a conductive agent, and a binder in an appropriate solvent, coating the suspension on a positive current collector, drying the suspension, and performing a press. A positive electrode pressing pressure is preferably in a range of 0.15 ton/mm to 0.3 ton/mm. Within this range, the adhesion (peeling strength) between the positive electrode active material-containing layer and the positive electrode current collector (for example, aluminum foil or aluminum alloy foil) is increased and the elongation percentage of the positive electrode current collector is preferably 20% or less.

5) Separator

The separator includes an alkali metal ion conductive solid electrolyte. The alkali metal ion is, for example, $Li^+$, $Na^+$, or $K^+$. The separator may have ion conductivity to two or more cations among $Li^+$, $Na^+$, and $K^+$.

The separator includes a portion disposed between the positive electrode and the negative electrode. A part of the separator may include a portion facing only the positive electrode or the negative electrode.

The alkali metal ion conductive solid electrolyte is included in ceramics. Thus, the solid electrolyte is not a proton ($H^+$) donor, but an aprotic conductor. Therefore, the separator including the solid electrolyte prevents permeation of protons and anions such as $OH^-$ while having alkali metal ion conductivity.

It is preferable that alkali metal ion conductive solid electrolyte has high stability to water and functions as an aprotic conductor around room temperature. Examples of the solid electrolyte satisfying this condition include a lithium phosphate solid electrolyte having a NASICON type structure represented by $Li_{1+x}M_2(PO_4)_3$ (M is one or more selected from the group consisting of Ti, Ge, Sr, Zr, Sn, and Al, and $0 \leq x \leq 0.5$), and an oxide solid electrolyte having a garnet type structure. The lithium phosphate solid electrolyte having the NASICON structure is excellent in stability to water, as compared with lithium lanthanum zirconate (LLZ). $Li_{1+x}Al_xGe_{2-x}(PO_4)_3$ ($0 \leq x \leq 0.5$), $Li_{1+x}Al_xZr_{2-x}(PO_4)_3$ ($0 \leq x \leq 0.5$), and $Li_{1+x}Al_xTi_{2-x}(PO_4)_3$ ($0 \leq x \leq 0.5$) are preferable because of its high ion conductivity, stability to water, and high electrochemical stability.

The oxide solid electrolyte having the garnet type structure has an advantage that the reduction resistance is high and the electrochemical window is wide. Examples of the oxide solid electrolyte having the garnet type structure include general formula $La_{5+x}A_xLa_{3-x}M_2O_{12}$ (A is at least one element selected from the group consisting of Ca, Sr, and Ba, M is Nb and/or Ta, and $0 \leq x \leq 1$), $Li_3M_{2-x}L_2O_{12}$ (M is Nb and/or Ta, L includes Zr, and x is preferably 0.5 or less (including 0)), $Li_{7-3x}Al_xLa_3Zr_3O_{12}$ (x is preferable 0.5 or less (including 0)), and $Li_7La_3Zr_2O_{12}$. $Li_{6.25}Al_{0.25}La_3Zr_3O_{12}$, $Li_{6.4}La_3Zr_{1.4}Ta_{0.6}O_{12}$, $Li_{6.4}La_3Zr_{1.6}Ta_{0.6}O_{12}$, and $Li_7La_3Zr_2O_{12}$ have high ion conductivity and are electrochemically stable so that they have excellent discharge performance and cycle life performance.

The separator is preferably in the form of a plate, with little or no pinholes. A thickness of the separator is, for example, 150 µm or less, and a preferable range is 20 µm to 50 µm.

The separator preferably includes a composite of an alkali metal ion conductive solid electrolyte and a polymer material (third polymer material). The first or second polymer material may be used as the third polymer material, but the third polymer material is preferably a polymer material which is insoluble in an aqueous solvent. Examples of the polymer material satisfying this requirement include polyethylene terephthalate (PET), polypropylene (PP), polyethylene (PE), a fluorine-containing polymer material, and the like. By using the fluorine-containing polymer material, water repellency can be imparted to the separator. In addition, a lithium ion conductive inorganic solid electrolyte has high stability to water and is excellent in lithium ion conductivity. By providing a composite of the lithium ion conductive inorganic solid electrolyte and the fluorine-containing polymer material, a solid electrolyte film having alkali metal ion conductivity and flexibility can be realized. Since the separator including the solid electrolyte film can reduce resistance, the high current performance of the secondary battery can be improved.

Examples of the fluorine-containing polymer material include polytetrafluoroethylene (PTFE), polychlorotrifluoroethylene (PCTFE), ethylene tetrafluoroethylene copolymer, polyethylene terephthalate (PET), polyvinylidene fluoride (PVdF), and the like. The kind of the fluorine-containing polymer material can be one kind or two or more kinds.

The content of the fluorine-containing polymer material of the separator is preferably 1 wt % to 20 wt %. Within this range, when the thickness of the separator is in a range of 10 to 100 µm, high mechanical strength can be obtained and the resistance of the separator can be reduced. Further, there is no fear that the solid electrolyte becomes a factor that inhibits lithium ion conductivity. A more preferable range of the content ratio is 3 wt % to 10 wt %.

For example, the separator can be molded into a film by mixing a powder of the solid electrolyte and a powder of the polymer material, uniformly dispersing them, and then performing hot press (for example, 150 to 400° C.). According to this method, a film-like separator without pinholes is obtained. The form of the polymer material can be, for example, granular or fibrous.

Examples of the ion conductive solid electrolyte of $Na^+$ include glass ceramics such as β-alumina, sodium phosphorus sulfide, sodium phosphorus oxide, and the like.

A method of measuring the content of the fluorine-containing polymer in the separator will be described below. The secondary battery is disassembled in a glove box filled with argon and the electrode group is extracted. The separator is separated from the extracted electrode group. The separator is pulverized by using a mortar or the like, the obtained pulverized product is dispersed in water, and the solid electrolyte and the fluorine-containing polymer are separated by using a difference in specific gravity. The fluorine-containing polymer in the supernatant is dried at 100° C. for 12 hours, the weight of the fluorine-containing polymer is measured, and the content of the fluorine-containing polymer in the separator is determined.

A method of measuring the content of the solid electrolyte in the separator will be described below. Thermogravimetry (TG) measurement up to 800° C. is performed on the separator to measure the content of the solid electrolyte from the weight loss of the organic solvent and the fluorine-containing polymer.

6) Container

As a container containing the positive electrode, the negative electrode, and the first and second electrolytes, a metal container, a laminate film container, or a resin container made of polyethylene or polypropylene can be used.

As the metal container, a metal can which is made of nickel, iron, stainless steel, or the like and has a square or cylindrical shape can be used.

The plate thickness of each of the resin container and the metal container is preferably 1 mm or less, more preferably 0.5 mm or less. A more preferable range is 0.3 mm or less. In addition, the lower limit of the plate thickness is preferably 0.05 mm.

Examples of the laminate film can include a multilayer film in which a metal layer is covered with a resin layer. Examples of the metal layer include a stainless steel foil, an aluminum foil, or an aluminum alloy foil. For the resin layer, polymers such as polypropylene (PP), polyethylene (PE), nylon, polyethylene terephthalate (PET), and the like can be used. A preferable range of the thickness of the laminate film is 0.5 mm or less. A more preferable range is 0.2 mm or less. In addition, the lower limit of the thickness of the laminate film is preferably 0.01 mm.

The secondary battery according to this embodiment can be applied to secondary batteries in various forms such as a rectangular type, a cylindrical type, a flat type, a thin type, and a coin type. The secondary battery preferably has a bipolar structure. Consequently, one secondary battery having the bipolar structure can be used for a high voltage battery instead of a plural of series batteries.

An example of the secondary battery according to the embodiment will be described with reference to FIGS. 1, 2, 3, and 4.

FIGS. 1 and 2 show an example of the secondary battery using a metal container.

An electrode group 1 is stored in a rectangular tubular metal container 2 having a bottom. The electrode group 1 has a structure formed by spirally winding a positive electrode 3 and a negative electrode 4 with a separator 5 interposing therebetween so as to form a flat shape. The first electrolyte (not shown) is held by the positive electrode 3 in the electrode group 1. On the other hand, the second electrolyte (not shown) is held by the negative electrode 4 in the electrode group 1. As shown in FIG. 2, a strip-shaped positive electrode lead 6 is electrically connected to each of a plural of portions at an end of the positive electrode 3 located on an end face of the electrode group 1. A strip-shaped negative electrode lead 7 is electrically connected to each of a plural of portions at an end of the negative electrode 4 located on the end face. The plural of positive electrode leads 6 are bundled, and in this state, electrically connected to a positive electrode tab 8. A positive electrode terminal is formed from the positive electrode leads 6 and the positive electrode tab 8. In addition, the negative electrode leads 7 are bundled, and in this state, connected to a negative electrode tab 9. A negative electrode terminal is formed from the negative electrode leads 7 and the negative electrode tab 9. A sealing plate 10 made of a metal is fixed to the opening portion of the metal container 2 by welding or the like. The positive electrode tab 8 and the negative electrode tab 9 are extracted to the outside from outlet holes formed in the sealing plate 10, respectively. The inner surface of each outlet hole of the sealing plate 10 is coated with an insulating member 11 to avoid a short circuit caused by contact between the positive electrode tab 8 and the sealing plate 10, or by contact between the negative electrode tab 9 and the sealing plate 10.

Figure 4:
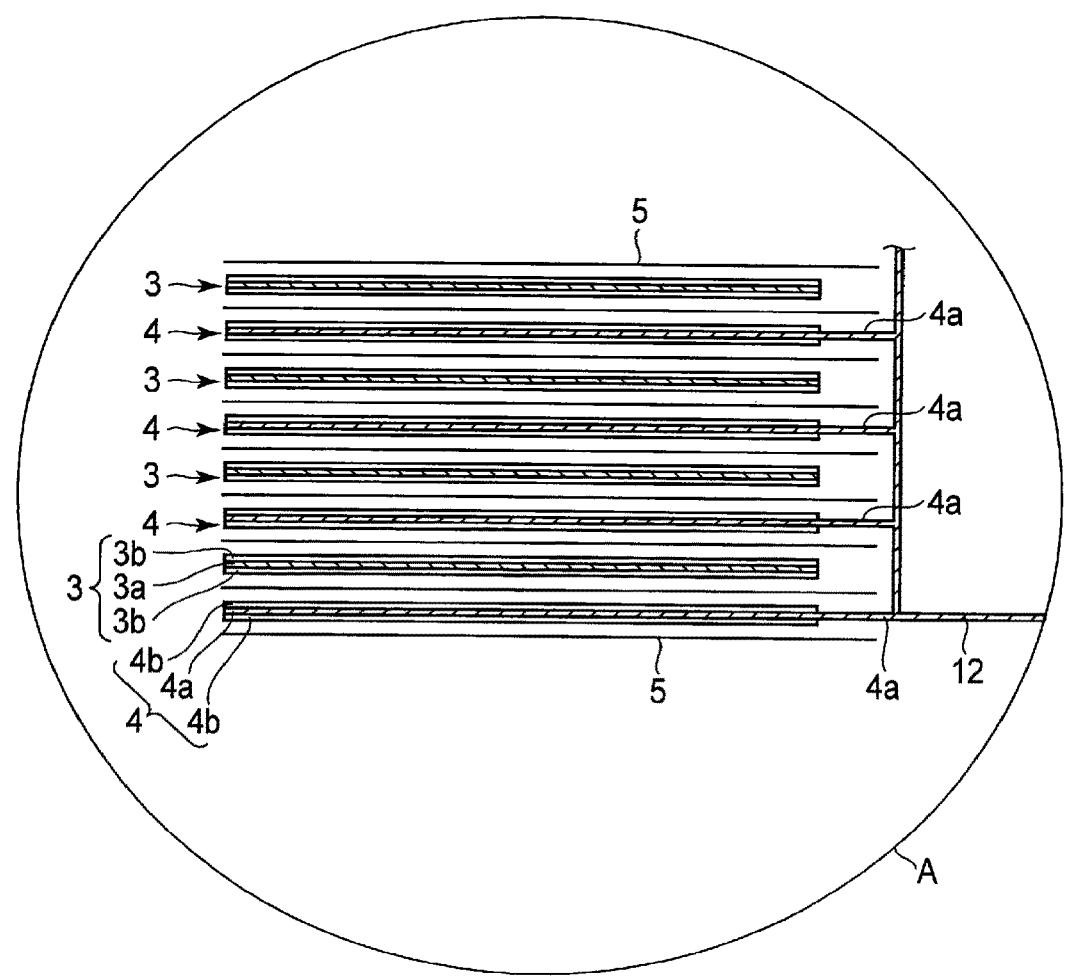
FIG. 4 is an enlarged cross-sectional view of a portion A of FIG. 3.

FIGS. 3 and 4 show an example of a secondary battery including a container member made of a laminated film.

The stacked electrode group 1 is stored in the sack-shaped container 2 made of a laminated film including a metal layer interposing between two resin films. The first electrolyte (not shown) is held by the positive electrode 3 in the electrode group 1. On the other hand, the second electrolyte (not shown) is held by the negative electrode 4 in the electrode group 1. As shown in FIG. 4, the stacked electrode group 1 has a structure formed by alternately stacking the positive electrodes 3 and the negative electrodes 4 with the separators 5 interposing therebetween. A plural of positive electrodes 3 exist, each of which includes a current collector 3a and positive electrode active material-containing layers 3b formed on both surfaces of the current collector 3a. A plural of negative electrodes 4 exist, each of which includes a current collector 4a and negative electrode active material-containing layers 4b formed on both surfaces of the current collector 4a. The current collector 4a of each negative electrode 4 has one side projecting from the positive electrodes 3. Each projecting current collector 4a is electrically connected to a strip-shaped negative electrode terminal 12. The distal end of a strip-shaped negative electrode terminal 12 is extracted from the container 2 to the outside. Although not illustrated, in the current collector 3a of each positive electrode 3, a side located on a side opposite to the projecting sides of the current collectors 4a projects from the negative electrodes 4. Each current collector 3a projecting from the negative electrodes 4 is electrically connected to a strip-shaped positive electrode terminal 13. The distal end of the strip-shaped positive electrode terminal 13 is located on the side opposite to the negative electrode terminal 12 and extracted from the side of the container 2 to the outside. The separators 5 are located on both outermost layers of the electrode group 1. The separator 5 on one outermost layer faces the positive electrode 3, and the separator 5 on the other outermost layer faces the negative electrode 4.

The secondary battery shown in FIGS. 1, 2, 3, and 4 can be provided with a rupture member to discharge hydrogen gas generated in the container to the outside. As the rupture member, either a reset type that operates when the internal pressure exceeds a set value and functions as a sealing plug when the internal pressure lowers, or a non-reset type that cannot recover the function as a sealing plug once it operates can be used. The secondary battery shown in FIGS. 1, 2, 3, and 4 is a close type. However, if a circulation system configured to return hydrogen gas to water is provided, an open system can be employed.

According to the secondary battery of the first embodiment described above, the first and second electrolytes and the separator are included. The first electrolyte is contained in at least the positive electrode and includes a first alkali metal salt and a first aqueous solvent. In addition, the second electrolyte is contained in at least the negative electrode and includes a second alkali metal salt and a second aqueous solvent. The separator includes an alkali metal ion conductive solid electrolyte. Therefore, it is possible to provide the secondary battery which is excellent in high current performance, cycle life performance, and storage performance.

Second Embodiment

According to the second embodiment, it is possible to provide a battery module including a secondary battery as a single battery. As the secondary battery, the secondary battery according to the first embodiment can be used.

Examples of the battery module include a battery module including, as a structural unit, a plural of single batteries electrically connected in series or parallel and a battery module including a unit constituted of a plural of single batteries electrically connected in series or a unit constituted of a plural of single batteries electrically connected in parallel. In the battery module, it is also possible to combine plural kinds of single batteries or plural kinds of units.

The battery module may be contained in a housing. As the housing, a metal can formed of aluminum alloy, iron, stainless steel, or the like or a plastic container may be used, for example. A plate thickness of the container is desirably not less than 0.5 mm.

Examples of an embodiment in which a plural of secondary batteries are electrically connected in series or parallel include an embodiment in which a plural of secondary batteries each provided with a container are electrically connected in series or parallel and an embodiment in which a plural of electrode groups contained in a common housing are electrically connected in series or parallel. As a specific example of the former embodiment, positive electrode terminals and negative electrode terminals of a plural of secondary batteries are connected by a metal bus bar (formed of aluminum, nickel, or copper, for example). As a specific example of the latter embodiment, a plural of electrode groups in a state of being electrochemically insulated by a partition are contained in one housing, and these electrode groups are electrically connected in series. When the number of batteries electrically connected in series is in the range of 5 to 7, voltage compatibility with a lead storage battery is improved. In order to further improve the voltage compatibility with the lead storage battery, it is preferable that five or six single batteries are connected in series.

Figure 5:
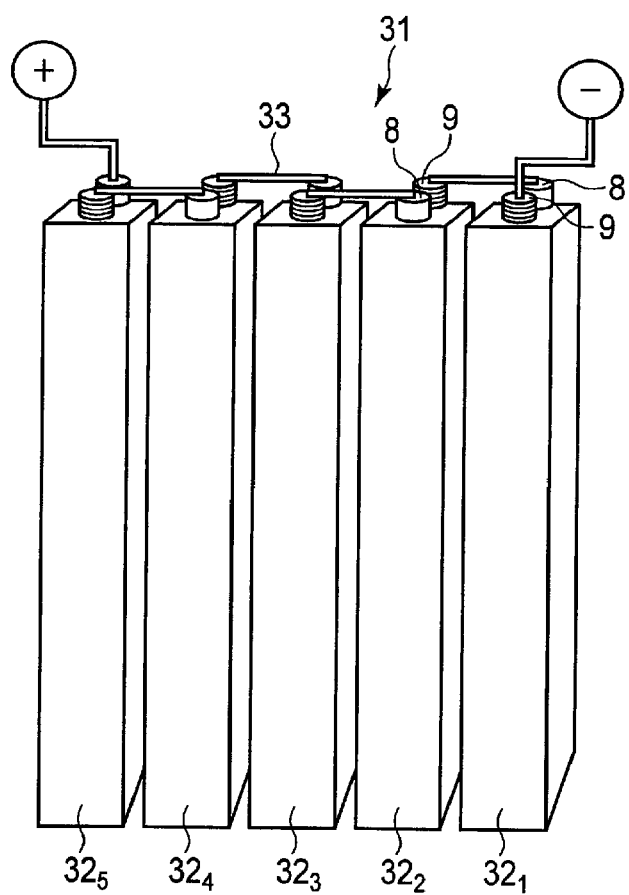
FIG. 5 is a perspective view illustrating an example of a battery module according to an embodiment.

An example of a battery module will be described with reference to FIG. 5. A battery module 31 shown in FIG. 5 includes, as single batteries, a plurality of rectangular secondary batteries (for example, FIGS. 1 and 2) $32_1$ to $32_5$ according to the first embodiment. A positive electrode tab 8 of the battery $32_1$ and a negative electrode tab 9 of the battery $32_2$ located adjacent to the battery $32_1$ are electrically connected by a lead 33. In addition, the positive electrode tab 8 of the battery $32_2$ and the negative electrode tab 9 of the battery $32_3$ located adjacent to the battery $32_2$ are electrically connected by the lead 33. The batteries $32_1$ to $32_5$ are thus electrically connected in series.

According to the battery module of the second embodiment, since the battery module includes the secondary battery according to the first embodiment, it is possible to implement a battery module having excellent discharge capacity, cycle life performance, and storage performance, and large-current performance. In addition, the secondary battery according to the first embodiment has satisfactory compatibility with a lead storage battery. It is therefore possible to use the battery module including five secondary batteries connected in series as a power supply alternative to a lead storage battery.

Third Embodiment

According to the third embodiment, it is possible to provide a battery pack including at least one secondary battery according to the first embodiment and a circuit portion configured to control charge and discharge of the secondary battery. A plural of secondary batteries can be electrically connected in series, in parallel, or in a combination of series connection and parallel connection. When forming a battery module from a plural of secondary batteries, the battery module according to the second embodiment can be used.

In a battery pack, a circuit portion may be connected to a secondary battery before the battery pack is installed in a vehicle such as an automobile or an electronic device; however, the battery pack of the embodiment includes a battery pack in which a circuit portion of a vehicle such as an automobile is connected to a secondary battery. Examples of the circuit portion include a protective circuit. The protective circuit has a function of controlling charge/discharge of the lithium secondary battery. Alternatively, a circuit included in a device (such as an electronic device and an automobile) using a battery pack as a power supply may be used as a protective circuit of the battery pack.

The battery pack may further comprise an external power distribution terminal. The external power distribution terminal is used for outputting a current from a secondary battery to the outside and/or for inputting a current to the secondary battery. In other words, when the battery pack is used as a power supply, a current is supplied to the outside through an external power distribution terminal. When the battery pack is charged, a charging current (including regenerative energy of the a motive force of a vehicle such as an automobile) is supplied to the battery pack through an external power distribution terminal.

Figure 6:
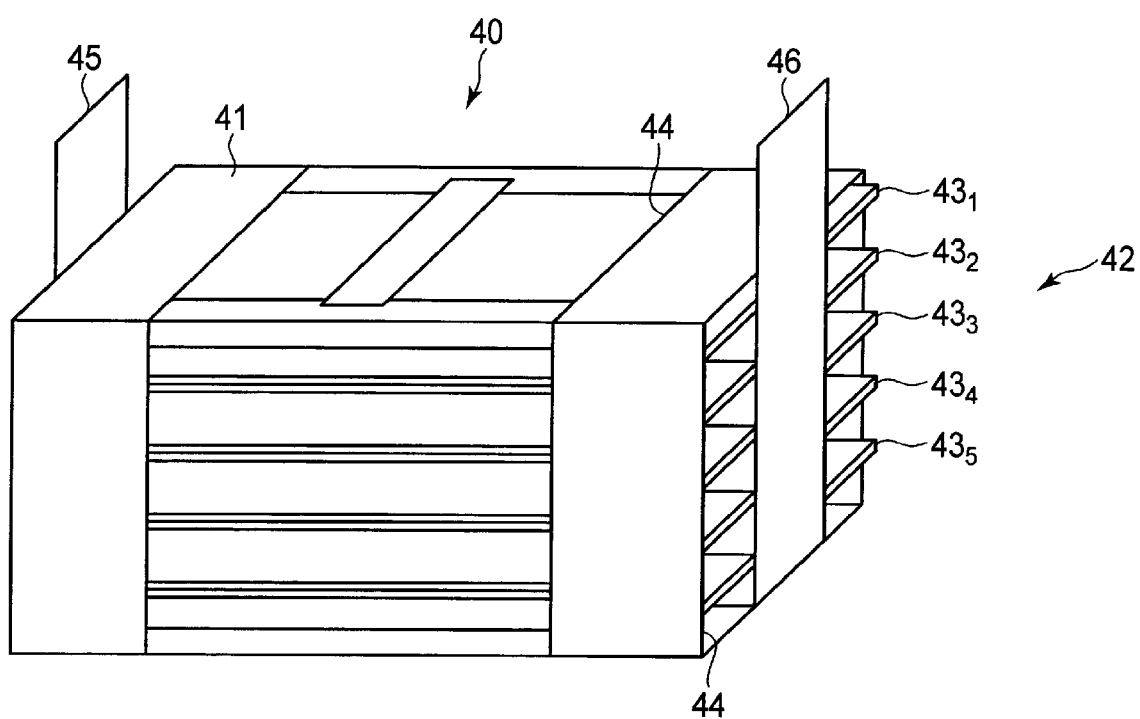
FIG. 6 is a perspective view illustrating an example of a battery pack according to an embodiment.

An example of the battery pack will be described with reference to FIG. 6. A battery pack 40 includes a battery module formed from secondary batteries shown in FIGS. 3 and 4. The battery pack 40 includes a case 41 and a battery module 42 stored in the case 41. The battery module 42 is formed by electrically connecting a plurality of (for example, five) secondary batteries $43_1$ to $43_5$ in series. The secondary batteries $43_1$ to $43_5$ are stacked in the thickness direction. The case 41 has an opening portion 44 in each of the upper portion and the four side surfaces. Side surfaces of the secondary batteries $43_1$ to $43_5$ from which positive and negative electrode terminals project are exposed to the opening portions 44 of the case 41. An output positive electrode terminal 45 of the battery module 42 has a strip shape. One end of the output positive electrode terminal 45 is electrically connected to the positive electrode terminal of one of the secondary batteries $43_1$ to $43_5$, and the other end projects from the opening portion 44 of the case 41 and projects from the upper portion of the case 41. On the other hand, an output negative electrode terminal 46 of the battery module 42 has a strip shape. One end of the output negative electrode terminal 46 is electrically connected to the negative electrode terminal of one of the secondary batteries $43_1$ to $43_5$, and the other end projects from the opening portion 44 of the case 41 and projects from the upper portion of the case 41.

Another example of the battery pack will be described in detail with reference to FIGS. 7 and 8. A plurality of single batteries 51 each formed from a flat secondary battery are stacked such that negative electrode terminals 52 and positive electrode terminals 53 which extend outward face in the same direction, and fastened by an adhesive tape 54 to form a battery module 55. The single batteries 51 are electrically connected in series, as shown in FIG. 8.

A printed wiring board 56 is arranged to face the side surfaces of the single batteries 51 from which the negative electrode terminals 52 and the positive electrode terminals 53 extend. As shown in FIG. 8, a thermistor 57, a protective circuit 58, and an external power distribution terminal 59 to an external device are mounted on the printed wiring board 56. Note that an insulating plate (not shown) is attached to the surface of the printed wiring board 56 facing the battery module 55 to avoid unwanted connection to the wires of the battery module 55.

A positive electrode lead 60 is connected to the positive electrode terminal 53 located in the lowermost layer of the battery module 55. The distal end of the positive electrode lead 60 is inserted into a positive electrode connector 61 of the printed wiring board 56 and electrically connected to the positive electrode connector 61. A negative electrode lead 62 is connected to the negative electrode terminal 52 located in the uppermost layer of the battery module 55. The distal end of the negative electrode lead 62 is inserted into a negative electrode connector 63 of the printed wiring board 56 and electrically connected to the negative electrode connector 63. The connectors 61 and 63 are connected to the protective circuit 58 via wires 64 and 65 formed on the printed wiring board 56.

The thermistor 57 detects the temperature of each single battery 51 and transmits the detection signal to the protective circuit 58. The protective circuit 58 can disconnect a positive wire 66a and a negative wire 66b between the protective circuit 58 and the external power distribution terminal 59 to an external device under a predetermined condition. The predetermined condition is that, for example, the temperature detected by the thermistor 57 is a predetermined temperature or more. Alternatively, the predetermined condition is detection of over-charge, over-discharge, or overcurrent of the single battery 51. The detection of over-charge or the like is done for each single battery 51 or the battery module 55. If the detection is performed for each single battery 51, a battery voltage may be detected, or a positive electrode potential or negative electrode potential may be detected. In the latter case, a lithium electrode to be used as a reference electrode is inserted into each single battery 51.

Figure 7:
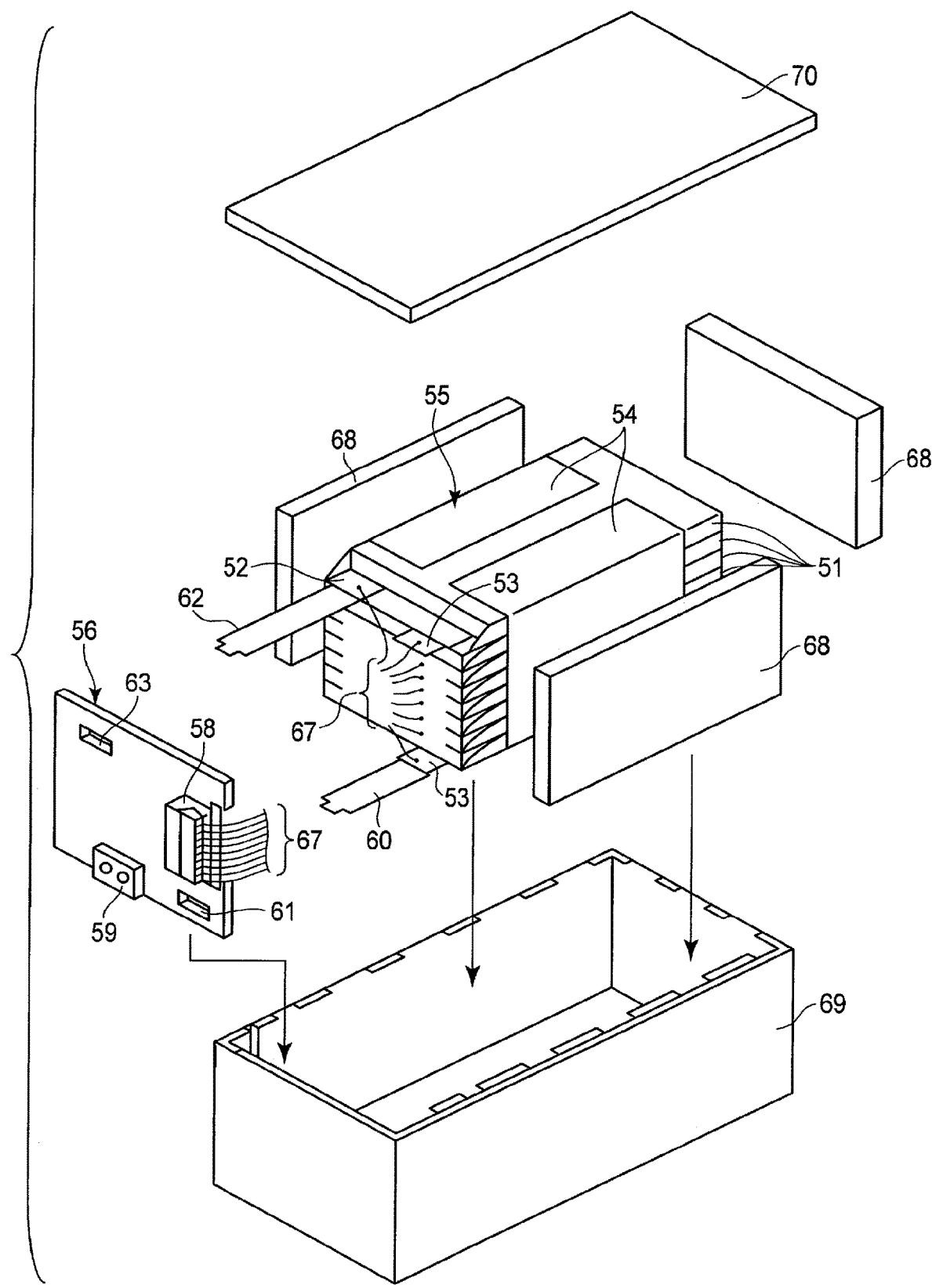
FIG. 7 is an exploded perspective view illustrating another example of a battery pack according to an embodiment.
Figure 8:
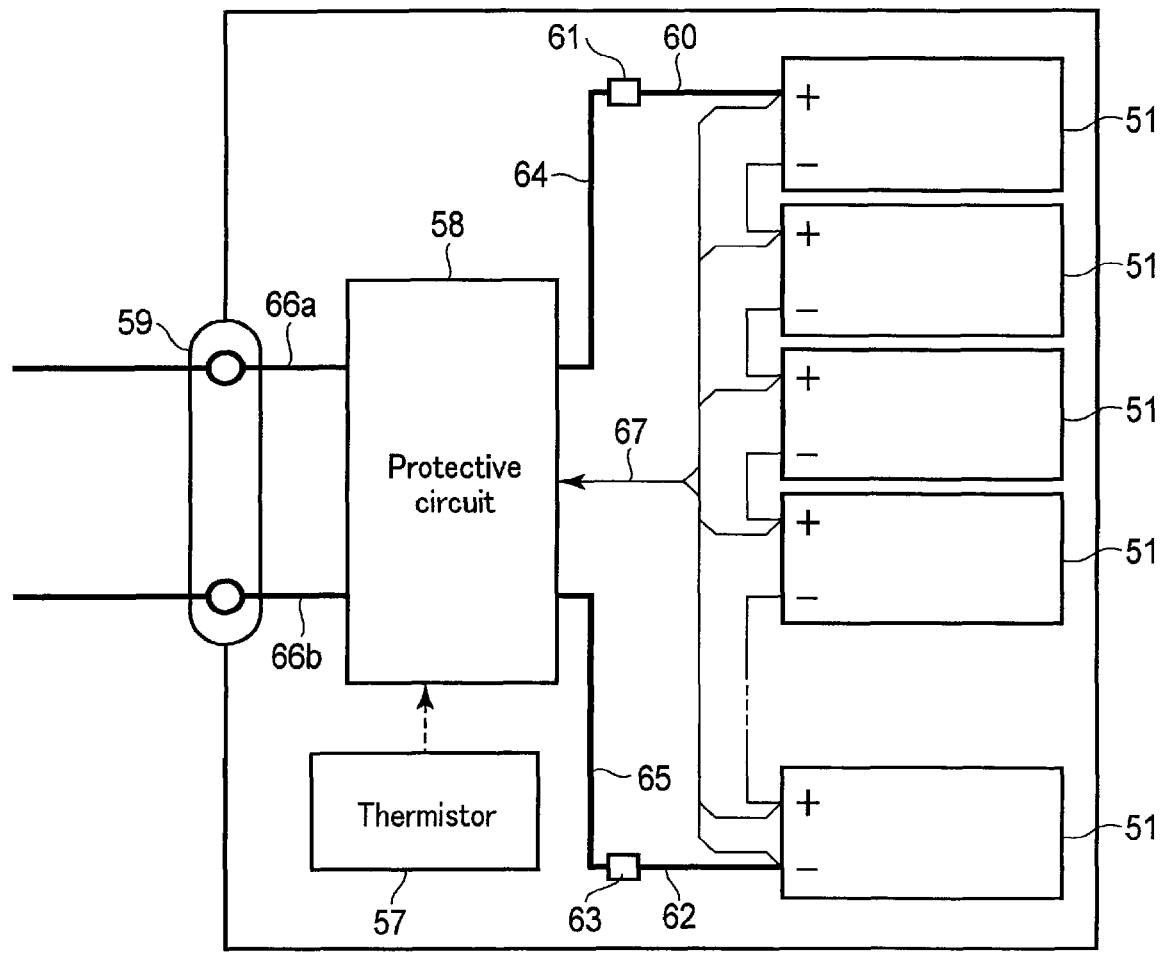
FIG. 8 is a block diagram illustrating an electric circuit of the battery pack of FIG. 7.

In FIGS. 7 and 8, a wire 67 used to detect a voltage is connected to each single battery 51, and a detection signal is transmitted to the protective circuit 58 via the wire 67.

A protective sheet 68 made of rubber or resin is arranged on each of three side surfaces of the battery module 55 except the side surface from which the positive electrode terminals 53 and the negative electrode terminals 52 project.

The battery module 55 is stored in a storage container 69 together with the protective sheets 68 and the printed wiring board 56. That is, the protective sheets 68 are arranged on both inner surfaces of the storage container 69 in the long-side direction and on an inner surface in the short-side direction. The printed wiring board 56 is arranged on the inner surface on the opposite side in the short-side direction. The battery module 55 is located in a space surrounded by the protective sheets 68 and the printed wiring board 56. A lid 70 is attached to the upper surface of the storage container 69.

Note that to fix the battery module 55, heat-shrinkable tape may be used in place of the adhesive tape 54. In this case, the protective sheets are arranged on both side surfaces of the battery module, and the heat-shrinkable tape is wrapped and shrunk by heat to bind the battery module.

FIGS. 7 and 8 show a form in which the single batteries 51 are connected in series. However, the single batteries may be connected in parallel to increase the battery capacity. Assembled battery packs may be connected in series and in parallel.

The embodiments of the battery pack may be appropriately altered depending on the application thereof. The application of the battery pack may include applications in which charging/discharging at high current is desired. Specific examples include a power supply battery for a digital camera, a stationary battery, and a vehicle battery. Examples of vehicles in vehicle batteries include two- or four-wheel hybrid electric vehicles, two- or four-wheel electric vehicles, motor-assisted bicycles, and railway vehicles (railway cars).

According to the battery pack of the third embodiment described above, since the secondary battery of the first embodiment is included, it is possible to realize the battery pack which is excellent in discharge capacity, cycle life performance, storage performance, and high current performance. Therefore, according to the embodiment, it is possible to provide a battery module and a battery pack which are suitable as an alternative power source for a lead battery used as a starter power source for a vehicle or an in-vehicle secondary battery installed in a hybrid vehicle.

Fourth Embodiment

According to the fourth embodiment, there is provided a vehicle including the secondary battery according to the first embodiment, the battery module according to the second embodiment, or the battery pack according to the third embodiment.

In the vehicle such as the automobile including the battery pack, for example, the battery pack is configured to recover the regenerative energy of the motive force of the vehicle.

Figure 9:
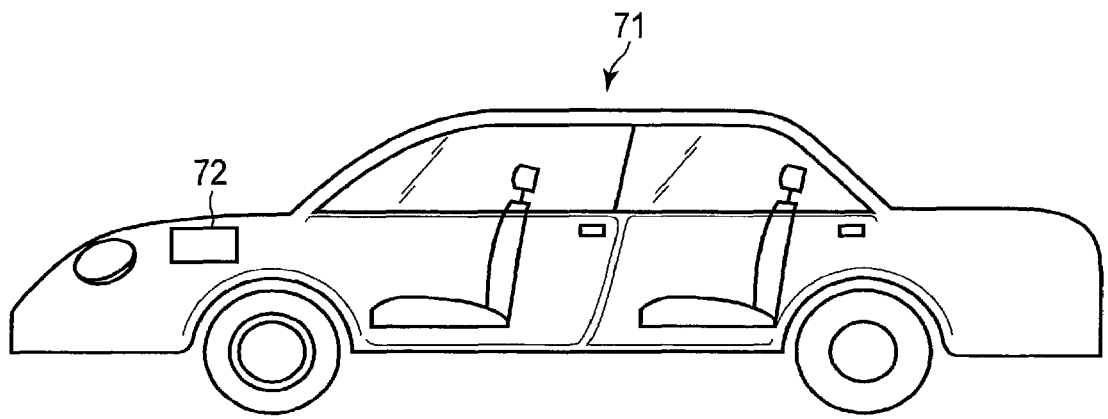
FIG. 9 is a schematic diagram illustrating an example of a vehicle in which the secondary battery of the embodiment is installed.

FIG. 9 is a cross-sectional view schematically showing an example of a vehicle according to the forth embodiment.

A vehicle 71, shown in FIG. 9 includes a vehicle body and a battery pack 72 according to the embodiment.

The battery pack 72 is installed in an engine compartment located at the front of the vehicle body. The location of installing the battery pack 72 is not particularly limited. The battery pack 72 may be installed in rear sections of the vehicle body, or under a seat. The battery pack 72 may be used as a power source of the vehicle 71. The battery pack 72 can also recover regenerative energy of motive force of the vehicle 71.

Figure 10:
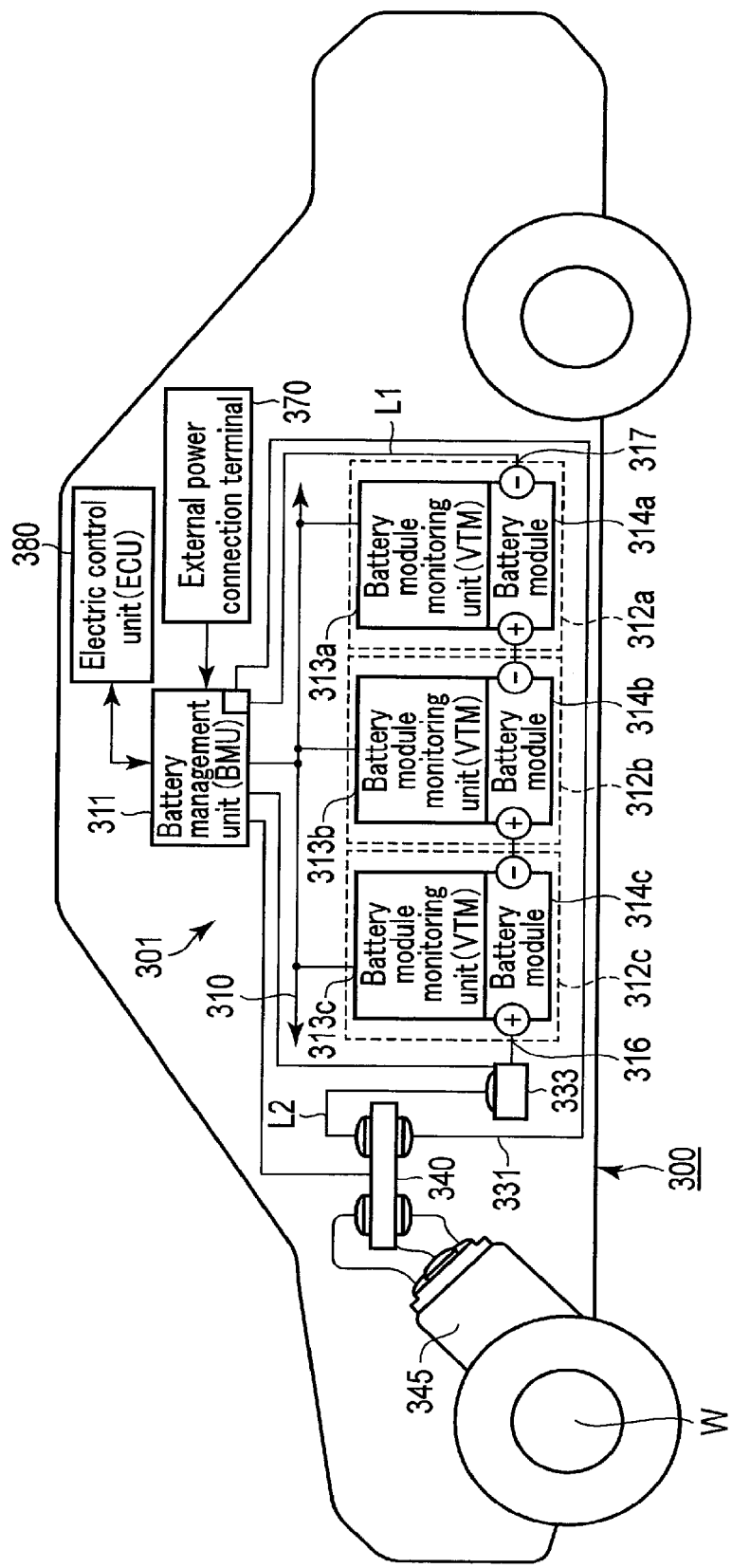
FIG. 10 is a schematic diagram illustrating another example of a vehicle in which the secondary battery of the embodiment is installed.

FIG. 10 is a view schematically showing an example of the vehicle according to the embodiment. A vehicle 300, shown in FIG. 10, is an electric automobile.

The vehicle 300, shown in FIG. 10, includes a vehicle body, a vehicle power source 301, a vehicle ECU (electric control unit) 380, which is a master controller of the vehicle power source 301, an external terminal (an external power connection terminal) 370, an inverter 340, and a drive motor 345.

The vehicle 300 includes the vehicle power source 301, for example, in the engine compartment, in the rear sections of the automobile body, or under a seat. In FIG. 10, the position of the vehicle power source 301 installed in the vehicle 300 is schematically shown.

The vehicle power source 301 includes plural (for example, three) battery packs 312a, 312b and 312c, BMU (a battery management unit) 311, and a communication bus 310.

The three battery packs 312a, 312b and 312c are electrically connected to each other in series. The battery pack 312a includes a battery module 314a and a battery module monitoring unit (VTM: voltage temperature monitoring) 313a. The battery pack 312b includes a battery module 314b, and a battery module monitoring unit 313b. The battery pack 312c includes a battery module 314c, and a battery module monitoring unit 313*c*. The battery packs 312*a*, 312*b* and 312*c* can each be independently removed, and may be exchanged by a different battery pack.

Each of the battery modules 314*a* to 314*c* includes plural single batteries connected to each other in series. At least one of the plural single batteries is the secondary battery according to the embodiment. The battery modules 314*a* to 314*c* each perform charging and discharging through a positive electrode terminal 316 and a negative electrode terminal 317.

In order to collect information concerning security of the vehicle power source 301, the battery management unit 311 performs communication with the battery module monitoring units 313*a* to 313*c* and collects information such as voltages or temperatures of the single batteries included in the battery modules 314*a* to 314*c* included in the vehicle power source 301.

The communication bus 310 is connected between the battery management unit 311 and the battery module monitoring units 313*a* to 313*c*. The communication bus 310 is configured so that multiple nodes (i.e., the battery management unit and one or more battery module monitoring units) share a set of communication lines. The communication bus 310 is, for example, a communication bus configured based on CAN (Control Area Network) standard.

The battery module monitoring units 313*a* to 313*c* measure a voltage and a temperature of each single battery in the battery modules 314*a* to 314*c* based on communications from the battery management unit 311. It is possible, however, to measure the temperatures only at several points per battery module, and the temperatures of all of the single batteries need not be measured.

The vehicle power source 301 may also have an electromagnetic contactor (for example, a switch unit 333 shown in FIG. 10) for switching connection between the positive electrode terminal and the negative electrode terminal. The switch unit 333 includes a precharge switch (not shown), which is turned on when the battery modules 314*a* to 314*c* are charged, and a main switch (not shown), which is turned on when battery output is supplied to a load. The precharge switch and the main switch include a relay circuit (not shown), which is turned on or off based on a signal supplied to a coil located near the switch element.

The inverter 340 converts an inputted DC (direct current) voltage to a three-phase AC (alternate current) high voltage for driving a motor. Three-phase output terminal(s) of the inverter 340 is connected to each three-phase input terminal of the drive motor 345. The inverter 340 controls an output voltage based on control signals from the battery management unit 311 or the vehicle ECU 380, which controls the whole operation of the vehicle.

The drive motor 345 is rotated by electric power supplied from the inverter 340. The rotation is transferred to an axle and driving wheels W, for example, through a differential gear unit.

The vehicle 300 also includes a regenerative brake mechanism, though not shown. The regenerative brake mechanism rotates the drive motor 345 when the vehicle 300 is braked, and converts kinetic energy into regenerative energy, as electric energy. The regenerative energy, recovered in the regenerative brake mechanism, is inputted into the inverter 340 and converted to direct current. The direct current is inputted into the vehicle power source 301.

One terminal of a connecting line L1 is connected through a current detector (not shown) in the battery management unit 311 to the negative electrode terminal 317 of the vehicle power source 301. The other terminal of the connecting line L1 is connected to a negative electrode input terminal of the inverter 340.

One terminal of a connecting line L2 is connected through the switch unit 333 to the positive electrode terminal 316 of the vehicle power source 301. The other terminal of the connecting line L2 is connected to a positive electrode input terminal of the inverter 340.

The external terminal 370 is connected to the battery management unit 311. The external terminal 370 is able to connect, for example, to an external power source.

The vehicle ECU 380 cooperatively controls the battery management unit 311 together with other units in response to inputs operated by a driver or the like, thereby performing the management of the whole vehicle. Data concerning the security of the vehicle power source 301, such as a remaining capacity of the vehicle power source 301, are transferred between the battery management unit 311 and the vehicle ECU 380 through communication lines.

In the vehicle including the secondary battery according to the embodiment, each of the battery packs 312*a*, 312*b*, and 312*c* has excellent in discharge capacity, cycle life performance, storage performance, and large-current performance. Hence, a reliable vehicle having excellent charge-and-discharge performance can be obtained. In addition, each battery pack is inexpensive and safe. It is therefore possible to suppress the cost of the vehicle and increase the safety.

According to the vehicle of the fourth embodiment described above, since the secondary battery of the first embodiment, the battery module of the second embodiment, or the battery pack of the third embodiment is included, it is possible to realize a highly reliable vehicle in which the decrease in the remaining capacity of the battery is alleviated.

EXAMPLES

Hereinafter, examples of the embodiments will be described in detail with reference to the drawings, but the embodiments is not limited to the examples described below.

Example 1

A lithium manganese oxide ($LiMn_2O_4$) having a spinel structure with an average secondary particle size of 5 μm was used as a positive electrode active material. 3 wt % of a vapor grown carbon fiber having a fiber diameter of 0.1 μm as a conductive agent, 5 wt % of a graphite powder as a conductive agent, and 5 wt % of polytetrafluoroethylene (PTFE) as a binder were mixed and dispersed in water to prepare a slurry. The mixing ratio of the conductive agent and the binder is a value when the total of the positive electrode active material, the conductive agent, and the binder is 100 wt %. The obtained slurry was coated on both surfaces of a nickel foil having a thickness of 10 μm and then dried, and positive electrode active material-containing layers were formed on both surfaces of the nickel foil through a press process to prepare a positive electrode having an electrode density of 2.2 g/cm³. The thickness of each positive electrode active material-containing layer was 43 μm.

In addition, a $Li_4Ti_5O_{12}$ powder having a spinel structure with a secondary particle size (diameter) of 10 μm, a zinc powder having an average particle size of 10 μm, and tetrafluoroethylene (PTFE) as a binder were mixed at a weight ratio of 92:5:3 and dispersed in water, and a slurry was prepared by using a ball mill in a condition that stirring was performed at a rotating speed of 1,000 rpm for a stirring time of 2 hours. The obtained slurry was coated on a nickel foil having a thickness of 10 μm and then dried, and negative electrode active material-containing layers were formed on both surfaces of the nickel foil through a press process to prepare a negative electrode having an electrode density of 2.2 g/cm$^3$. The thickness of each negative electrode active material-containing layer was 59 μm.

As the second electrolyte (electrolyte B), 6 mol/L Li[(FSO$_2$)$_2$N] was dissolved in water, and an aqueous solution was adjusted so that a molar ratio (H$_2$O/Li) of the number of moles of water to the number of moles of lithium ions of Li[(FSO$_2$)$_2$N]) became 1:8. The pH of the aqueous solution is shown in Table 3 as the pH of the second electrolyte before charge. The aqueous solution was impregnated into the negative electrode.

As the separator, a Li$_{1.3}$Al$_{0.3}$Zr$_{1.7}$(PO$_4$)$_3$ plate having a thickness of 50 μm was used. Li$_{1.3}$Al$_{0.3}$Zr$_{1.7}$(PO$_4$)$_3$ is a lithium ion conductive solid electrolyte.

As the first electrolyte (electrolyte A), an aqueous solution was prepared by dissolving 2 mol of Li$_2$SO$_4$ in 1 L of water. The pH of the aqueous solution is shown in Table 3 as the pH of the first electrolyte before charge. After the first electrolyte was impregnated into the positive electrode, the separator was overlapped on the positive electrode. An electrode group was prepared by overlapping the negative electrode so that the negative electrode active material-containing layer faces the positive electrode active material-containing layer through the separator. An electrode width (length of a short side) of the positive electrode active material-containing layer was 50 mm, and an electrode width (length of a short side) of the negative electrode active material-containing layer was 51 mm.

The electrode group was accommodated in a thin metal can container made of stainless steel having a thickness of 0.25 mm. A valve as the rupture member is installed in the metal can such that a gas leaks therethrough when an internal pressure is 2 atm or more. As such, a thin secondary battery having a thickness of 16 mm, a width of 40 mm, and a height of 60 mm was manufactured.

Example 2

A Li$_{1.3}$Al$_{0.3}$Zr$_{1.7}$(PO$_4$)$_3$ powder having an average particle size of 1 μm was mixed with a PTFE-containing dispersion solution, casted, dried, and hot-pressed at 350° C. to prepare a composite film having a thickness of 20 μm. The composite film had a composition in which a lithium ion conductive solid electrolyte and PTFE were mixed at a weight ratio of 92:8.

A secondary battery was manufactured in the same manner as in Example 1, except that the obtained composite film was used as a separator.

Examples 3 to 9

A secondary battery was manufactured in the same manner as in Example 1, except that the first electrolyte and the second electrolyte shown in Table 3 were used.

The second electrolyte (electrolyte B) of Example 6 was an aqueous solution in which 2 mol/L LiCl aqueous solution and 0.5 mol/L LiOH aqueous solution were mixed at a volume ratio of 4:1. A lithium ion concentration of the second electrolyte (electrolyte B) of Example 6 was 1.7 mol/L.

In addition, the first electrolyte (electrolyte A) of Example 8 was an aqueous solution in which 8 mol/L LiCl aqueous solution and 0.01 mol/L Li$_2$CO$_3$ aqueous solution were mixed at a volume ratio of 2:1. A lithium ion concentration of the first electrolyte (electrolyte A) of Example 8 was 5.34 mol/L.

Example 10

A Li$_{1.3}$Al$_{0.3}$Zr$_{1.7}$(PO$_4$)$_3$ powder having an average particle size of 1 μm was mixed with a PTFE-containing dispersion solution, casted, dried, and hot-pressed at 350° C. to prepare a composite film having a thickness of 20 μm. The composite film had a composition in which a lithium ion conductive solid electrolyte and PTFE were mixed at a weight ratio of 97:3.

A secondary battery was manufactured in the same manner as in Example 1, except that the obtained composite film was used as the separator and the first electrolyte and the second electrolyte shown in Table 3 were used.

Example 11

As the separator, a Li$_{1.4}$Al$_{0.4}$Ge$_{0.2}$Ti$_{1.4}$(PO$_4$)$_3$ plate having a thickness of 30 μm was used. Li$_{1.4}$Al$_{0.4}$Ge$_{0.2}$Ti$_{1.4}$(PO$_4$)$_3$ is a lithium ion conductive solid electrolyte. A secondary battery was manufactured in the same manner as in Example 1, except that the separator was used and the first electrolyte and the second electrolyte shown in Table 3 were used.

Example 12

A Li$_{1.4}$Al$_{0.4}$Ge$_{0.2}$Ti$_{1.4}$(PO$_4$)$_3$ powder having an average particle size of 1 μm was mixed with a PTFE-containing dispersion solution, casted, dried, and hot-pressed at 350° C. to prepare a composite film having a thickness of 20 μm. The composite film had a composition in which a lithium ion conductive solid electrolyte and PTFE were mixed at a weight ratio of 97:3.

A secondary battery was manufactured in the same manner as in Example 1, except that the obtained composite film was used as the separator and the first electrolyte and the second electrolyte shown in Table 3 were used.

Example 13

A secondary battery was manufactured in the same manner as in Example 1, except that the first electrolyte and the second electrolyte shown in Table 3 were used.

Examples 14 to 18

A secondary battery was manufactured in the same manner as in Example 1, except that the positive electrode active material and the negative electrode active material shown in Table 1 and the first electrolyte and the second electrolyte shown in Table 3 were used.

Example 19

As the separator, a Li$_6$SrLa$_2$Ta$_2$O$_{12}$ plate having a thickness of 30 μm was used. Li$_6$SrLa$_2$Ta$_2$O$_{12}$ is a lithium ion conductive solid electrolyte having a garnet type structure. A secondary battery was manufactured in the same manner as in Example 1, except that the separator was used and the first electrolyte and the second electrolyte shown in Table 3 were used.

Example 20

A Li$_{1.5}$Al$_{0.5}$Ge$_{1.5}$(PO$_4$)$_3$ powder having an average particle size of 1 μm was mixed with granular PCTFE, dispersed in water serving as a solvent, casted, dried, and hot-pressed at a high temperature of 350° C. to prepare a composite film having a thickness of 20 μm. The composite film had a composition in which a lithium ion conductive solid electrolyte and PCTFE were mixed at a weight ratio of 97:3.

A secondary battery was manufactured in the same manner as in Example 1, except that the obtained composite film was used as the separator and the first electrolyte and the second electrolyte shown in Table 3 were used.

Example 21

A powder of $Li_{1.5}Al_{0.5}Ge_{1.5}(PO_4)_3$ powder having an average particle size of 1 μm and an ethylene tetrafluoroethylene copolymer powder were mixed and dispersed in water serving as a solvent, and the mixture was casted, dried, and hot-pressed at 350° C. to prepare a composite film having a thickness of 20 μm. The composite film had a composition in which a lithium ion conductive solid electrolyte and an ethylene tetrafluoroethylene copolymer were mixed at a weight ratio of 97:3.

A secondary battery was manufactured in the same manner as in Example 1, except that the obtained composite film was used as the separator and the first electrolyte and the second electrolyte shown in Table 4 were used.

Example 22

A powder of $Li_{1.5}Al_{0.5}Ge_{1.5}(PO_4)_3$ powder having an average particle size of 1 μm and a PET powder were mixed and dispersed in water serving as a solvent, and the mixture was casted, dried, and hot-pressed at 350° C. to prepare a composite film having a thickness of 20 μm. The composite film had a composition in which a lithium ion conductive solid electrolyte and PET were mixed at a weight ratio of 97:3.

A secondary battery was manufactured in the same manner as in Example 1, except that the obtained composite film was used as the separator and the first electrolyte and the second electrolyte shown in Table 4 were used.

Example 23

A $Li_{1.3}Al_{0.3}Zr_{1.7}(PO_4)_3$ powder having an average particle size of 1 μm was mixed with a PTFE-containing dispersion solution, casted, dried, and hot-pressed at 350° C. to prepare a composite film having a thickness of 20 μm. The composite film had a composition in which a lithium ion conductive solid electrolyte and PTFE were mixed at a weight ratio of 97:3.

The negative electrode obtained in the same manner as in Example 1 was impregnated with the second electrolyte shown in Table 4. In addition, the positive electrode obtained in the same manner as in Example 1 was impregnated with the first electrolyte shown in Table 4. Subsequently, a composite film was arranged as a separator between the positive electrode and the negative electrode, and these were wound in a flat spiral shape. The obtained wound product was pressed to obtain a flat electrode group. The electrode group was accommodated in a thin metal can container made of stainless steel having a thickness of 0.25 mm. A valve as the rupture member is installed in the metal can such that a gas leaks therethrough when an internal pressure is 2 atm or more. As such, a thin secondary battery having a structure shown in FIG. 1 and having a thickness of 16 mm, a width of 40 mm, and a height of 60 mm was manufactured.

Example 24

A secondary battery was manufactured in the same manner as in Example 1, except that the first electrolyte and the second electrolyte shown in Table 4 were used.

Comparative Examples 1 to 5

A secondary battery was manufactured in the same manner as in Example 1, except that a polypropylene porous film having a thickness of 20 μm was used as the separator and the first electrolyte and the second electrolyte shown in Table 4 were used.

The first electrolyte (electrolyte A) of Comparative Example 3 was an aqueous solution in which 2 mol/L LiCl aqueous solution and 0.5 mol/L LiOH aqueous solution were mixed at a volume ratio of 4:1.

After the obtained secondary battery was charged to 2.7 V at a constant current of 2 A (corresponding to approximately 1 C) at 25° C., a discharge capacity was measured when the secondary battery was discharged up to 1.5 V at 2 A. Tables 5 and 6 show the obtained discharge capacity as 25° C. discharge capacity.

A cycle test of the secondary battery was performed under the following conditions. A charge-and-discharge cycle of charging the secondary battery to 2.7 V at a constant current of 2 A at 25° C. and then discharging the secondary battery up to 1.5 V at 2 A was repeated, and the number of cycles when the discharge capacity reached a value corresponding to 80% of the initial capacity are shown as a cycle life in Tables 5 and 6.

A high current discharge performance test of the secondary battery was performed under the following conditions. After the secondary battery was charged to 2.7 V at 2 A, a discharge capacity was measured when the secondary battery was discharged to 1.5 V at 10 A. After the secondary battery was charged to 2.7 V at 2 A, a discharge capacity was measured when the secondary battery was discharged to 1.5 V at 2 A. Tables 5 and 6 show the discharge capacity at 10 A with the discharge capacity at 2 A expressed as 100% as the high current discharge capacity retention ratio.

A storage test of the secondary battery was performed under the following conditions. After the secondary battery was charged to 2.7 V at 2 A, a self-discharge rate after left at 45° C. for 1 week was obtained. When the discharge capacity before left is 100%, the discharge capacity after left is shown as the self-discharge rate in Tables 5 and 6. The pH of the first electrolyte and the second electrolyte after 10 cycles in the charge-and-discharge cycle test was measured by the above-described method.

TABLE 1

| | Composition of positive electrode active material | Average particle size of positive electrode active material (μm) | Composition of negative electrode active material | Average particle size of negative electrode active material (μm) | Separator |
|---|---|---|---|---|---|
| Example 1 | $LiMn_2O_4$ | 5 | $Li_4Ti_5O_{12}$ | 10 | $Li_{1.3}Al_{0.3}Zr_{1.7}(PO_4)_3$ |
| Example 2 | $LiMn_2O_4$ | 5 | $Li_4Ti_5O_{12}$ | 10 | $Li_{1.3}Al_{0.3}Zr_{1.7}(PO_4)_3$ and PTFE |
| Example 3 | $LiMn_2O_4$ | 5 | $Li_4Ti_5O_{12}$ | 10 | $Li_{1.3}Al_{0.3}Zr_{1.7}(PO_4)_3$ |
| Example 4 | $LiMn_2O_4$ | 5 | $Li_4Ti_5O_{12}$ | 10 | $Li_{1.3}Al_{0.3}Zr_{1.7}(PO_4)_3$ |
| Example 5 | $LiMn_2O_4$ | 5 | $Li_4Ti_5O_{12}$ | 10 | $Li_{1.3}Al_{0.3}Zr_{1.7}(PO_4)_3$ |
| Example 6 | $LiMn_2O_4$ | 5 | $Li_4Ti_5O_{12}$ | 10 | $Li_{1.3}Al_{0.3}Zr_{1.7}(PO_4)_3$ |
| Example 7 | $LiMn_2O_4$ | 5 | $Li_4Ti_5O_{12}$ | 10 | $Li_{1.3}Al_{0.3}Zr_{1.7}(PO_4)_3$ |
| Example 8 | $LiMn_2O_4$ | 5 | $Li_4Ti_5O_{12}$ | 10 | $Li_{1.3}Al_{0.3}Zr_{1.7}(PO_4)_3$ |
| Example 9 | $LiMn_2O_4$ | 5 | $Li_4Ti_5O_{12}$ | 10 | $Li_{1.3}Al_{0.3}Zr_{1.7}(PO_4)_3$ |
| Example 10 | $LiMn_2O_4$ | 5 | $Li_4Ti_5O_{12}$ | 10 | $Li_{1.3}Al_{0.3}Zr_{1.7}(PO_4)_3$ and PTFE |
| Example 11 | $LiMn_2O_4$ | 5 | $Li_4Ti_5O_{12}$ | 10 | $Li_{1.4}Al_{0.3}Ge_{0.2}Ti_{1.4}(PO_4)_3$ |
| Example 12 | $LiMn_2O_4$ | 5 | $Li_4Ti_5O_{12}$ | 10 | $Li_{1.4}Al_{0.4}Ge_{0.2}Ti_{1.4}(PO_4)_3$ and PTFE |
| Example 13 | $LiMn_2O_4$ | 5 | $Li_4Ti_5O_{12}$ | 10 | $Li_{1.3}Al_{0.3}Zr_{1.7}(PO_4)_3$ |
| Example 14 | $LiMn_2O_4$ | 5 | $TiNb_2O_7$ | 5 | $Li_{1.3}Al_{0.3}Zr_{1.7}(PO_4)_3$ |
| Example 15 | $LiMn_2O_4$ | 5 | $TiO_2$ having anatase structure | 10 | $Li_{1.3}Al_{0.3}Zr_{1.7}(PO_4)_3$ |
| Example 16 | $LiNi_{0.8}Co_{0.1}Mn_{0.1}O_2$ | 5 | $TiNb_2O_7$ | 5 | $Li_{1.3}Al_{0.3}Zr_{1.7}(PO_4)_3$ |
| Example 17 | $LiFePO_4$ having olivine structure | 1 | $TiNb_2O_7$ | 5 | $Li_{1.3}Al_{0.3}Zr_{1.7}(PO_4)_3$ |
| Example 18 | $LiMnPO_4$ having olivine structure | 1 | $TiNb_2O_7$ | 5 | $Li_{1.3}Al_{0.3}Zr_{1.7}(PO_4)_3$ |
| Example 19 | $LiMn_2O_4$ | 5 | $Li_4Ti_5O_{12}$ | 10 | $Li_6SrLa_2Ta_2O_{12}$ |
| Example 20 | $LiMn_2O_4$ | 5 | $Li_4Ti_5O_{12}$ | 10 | $Li_{1.5}Al_{0.5}Ge_{1.5}(PO_4)_3$ and PCTFE |

TABLE 2

| | Composition of positive electrode active material | Average particle size of positive electrode active material (μm) | Composition of negative electrode active material | Average particle size of negative electrode active material (μm) | Separator |
|---|---|---|---|---|---|
| Example 21 | $LiMn_2O_4$ | 5 | $Li_4Ti_5O_{12}$ | 10 | $Li_{1.5}Al_{0.5}Ge_{1.5}(PO_4)_3$ and ethylene tetrafluoroethylene copolymer |
| Example 22 | $LiMn_2O_4$ | 5 | $Li_4Ti_5O_{12}$ | 10 | $Li_{1.5}Al_{0.5}Ge_{1.5}(PO_4)_3$ and PET |
| Example 23 | $LiMn_2O_4$ | 5 | $Li_4Ti_5O_{12}$ | 10 | $Li_{1.3}Al_{0.3}Zr_{1.7}(PO_4)_3$ and PTFE Wound type electrode group |
| Example 24 | $LiMn_2O_4$ | 5 | $Li_4Ti_5O_{12}$ | 10 | $Li_{1.3}Al_{0.3}Zr_{1.7}(PO_4)_3$ |
| Comparative Example 1 | $LiMn_2O_4$ | 5 | $Li_4Ti_5O_{12}$ | 10 | Polypropylene porous film (20 μm) |
| Comparative Example 2 | $LiMn_2O_4$ | 5 | $Li_4Ti_5O_{12}$ | 10 | Polypropylene porous film (20 μm) |
| Comparative Example 3 | $LiMn_2O_4$ | 5 | $Li_4Ti_5O_{12}$ | 10 | Polypropylene porous film (20 μm) |
| Comparative Example 4 | $LiMn_2O_4$ | 5 | $Li_4Ti_5O_{12}$ | 10 | Polypropylene porous film (20 μm) |
| Comparative Example 5 | $LiMn_2O_4$ | 5 | $Li_4Ti_5O_{12}$ | 10 | Polypropylene porous film (20 μm) |

TABLE 3

| | First electrolyte (electrolyte A) | pH of first electrolyte before charge | pH of first electrolyte after 10 cycles | Second electrolyte (electrolyte B) | pH of second electrolyte before charge | pH of second electrolyte after 10 cycles |
|---|---|---|---|---|---|---|
| Example 1 | 2 mol/L $Li_2SO_4$ | 4.5 | 5 | 6 mol/L $Li\{(FSO_2)_2N\}$ | 6.1 | 13 |
| Example 2 | 2 mol/L $Li_2SO_4$ | 4.5 | 5 | 6 mol/L $Li\{(FSO_2)_2N\}$ | 6.1 | 13 |
| Example 3 | 2 mol/L $Li_2SO_4$ | 4.5 | 5 | 8 mol/L LiCl | 3 | 12.5 |
| Example 4 | 2 mol/L $Li_2SO_4$ | 4.5 | 5 | 4 mol/L $Li\{(CF_3SO_2)_2N\}$ | 6.0 | 12.5 |
| Example 5 | 8 mol/L LiCl | 3 | 4 | 8 mol/L LiCl | 3 | 12.5 |
| Example 6 | 8 mol/L LiCl | 3 | 4 | 2 mol/L LiCl/ 0.5 mol/L LiOH(4:1) | 13.5 | 14 |
| Example 7 | 3 mol/L $LiNO_3$ | 4 | 5 | 8 mol/L LiCl | 3 | 12.5 |
| Example 8 | 8 mol/L LiCl/ 0.01 mol/L $Li_2CO_3$(2:1) | 2.8 | 3.5 | 8 mol/L LiCl | 3 | 12.5 |
| Example 9 | 8 mol/L LiCl | 3 | 4 | 8 mol/L $Li\{(CF_3SO_2)_2N\}$ | 6.1 | 13 |
| Example 10 | 8 mol/L LiCl | 3 | 4 | 8 mol/L $Li\{(FSO_2)_2N\}$ | 6.1 | 13 |

TABLE 3-continued

| | First electrolyte (electrolyte A) | pH of first electrolyte before charge | pH of first electrolyte after 10 cycles | Second electrolyte (electrolyte B) | pH of second electrolyte before charge | pH of second electrolyte after 10 cycles |
|---|---|---|---|---|---|---|
| Example 11 | 8 mol/L LiCl | 3 | 4 | 8 mol/L Li{(FSO$_2$)$_2$N} | 6.1 | 13 |
| Example 12 | 8 mol/L LiCl | 3 | 4 | 8 mol/L Li{(FSO$_2$)$_2$N} | 6.1 | 13 |
| Example 13 | 2 mol/L Li{(CF$_3$SO$_2$)$_2$N} | 6.0 | 6 | 8 mol/L Li{(FSO$_2$)$_2$N} | 6.1 | 13 |
| Example 14 | 2 mol/L Li$_2$SO$_4$ | 4.5 | 5 | 8 mol/L Li{(FSO$_2$)$_2$N} | 6.1 | 13 |
| Example 15 | 2 mol/L Li$_2$SO$_4$ | 4.5 | 5 | 8 mol/L Li{(FSO$_2$)$_2$N} | 6.1 | 13 |
| Example 16 | 2 mol/L Li$_2$SO$_4$ | 4.5 | 5 | 8 mol/L Li{(FSO$_2$)$_2$N} | 6.1 | 13 |
| Example 17 | 8 mol/L LiCl | 3 | 4 | 8 mol/L Li{(FSO$_2$)$_2$N} | 6.1 | 13 |
| Example 18 | 2 mol/L Li$_2$SO$_4$ | 4.5 | 5 | 8 mol/L Li{(FSO$_2$)$_2$N} | 6.1 | 13 |
| Example 19 | 8 mol/L LiCl | 3 | 4 | 8 mol/L LiCl | 3 | 12.5 |
| Example 20 | 8 mol/L LiCl | 3 | 4 | 8 mol/L LiCl | 3 | 12.5 |

TABLE 4

| | First electrolyte (electrolyte A) | pH of first electrolyte before charge | pH of first electrolyte after 10 cycles | Second electrolyte (electrolyte B) | pH of second electrolyte before charge | pH of second electrolyte after 10 cycles |
|---|---|---|---|---|---|---|
| Example 21 | 8 mol/L LiCl | 3 | 4 | 8 mol/L LiCl | 3 | 12.5 |
| Example 22 | 8 mol/L LiCl | 3 | 4 | 8 mol/L LiCl | 3 | 12.5 |
| Example 23 | 8 mol/L LiCl | 3 | 4 | 8 mol/L LiCl | 3 | 12.5 |
| Example 24 | 2 mol/L LiOH | 14 | 14 | 8 mol/L LiCl | 3 | 6 |
| Comparative Example 1 | 2 mol/L Li$_2$SO$_4$ | 4.5 | 4.5 | 2 mol/L Li$_2$SO$_4$ | 4.5 | 4.5 |
| Comparative Example 2 | 2 mol/L Li$_2$SO$_4$ | 4.0 | 4.0 | 8 mol/L LiCl | 4.0 | 4.0 |
| Comparative Example 3 | 2 mol/L LiCl and 0.5 mol/L LiOH | 13 | 13 | 2 mol/L Li$_2$SO$_4$ | 13 | 13 |
| Comparative Example 4 | 2 mol/L LiOH | 13.5 | 13.5 | 2 mol/L Li$_2$SO$_4$ | 13.5 | 13.5 |
| Comparative Example 5 | 4 mol/L Li{(CF$_3$SO$_2$)$_2$N} | 5 | 5 | 4 mol/L LiCl | 5 | 5 |

TABLE 5

| | 25° C. discharge capacity (mAh) | High current discharge capacity retention ratio (%) | Cycle life (times) | 45° C. storage self-discharge performance (%) |
|---|---|---|---|---|
| Example 1 | 2300 | 80 | 4000 | 2 |
| Example 2 | 2400 | 85 | 3500 | 3 |
| Example 3 | 2300 | 80 | 4000 | 2 |
| Example 4 | 2300 | 75 | 3500 | 3 |
| Example 5 | 2300 | 85 | 2500 | 5 |
| Example 6 | 2300 | 80 | 3500 | 3 |
| Example 7 | 2300 | 75 | 3000 | 4 |
| Example 8 | 2300 | 80 | 3000 | 3 |
| Example 9 | 2200 | 85 | 3000 | 5 |
| Example 10 | 2200 | 90 | 3000 | 5 |
| Example 11 | 2400 | 85 | 3200 | 3 |
| Example 12 | 2500 | 90 | 3300 | 4 |
| Example 13 | 2400 | 90 | 3400 | 2 |
| Example 14 | 2600 | 80 | 3000 | 5 |
| Example 15 | 2400 | 75 | 2000 | 8 |
| Example 16 | 2700 | 80 | 2600 | 4 |
| Example 17 | 2300 | 70 | 4000 | 2 |
| Example 18 | 2200 | 70 | 2000 | 8 |
| Example 19 | 2000 | 60 | 2000 | 5 |
| Example 20 | 2100 | 80 | 3000 | 5 |

TABLE 6

| | 25° C. discharge capacity (mAh) | High current discharge capacity retention ratio (%) | Cycle life (times) | 45° C. storage self-discharge performance (%) |
|---|---|---|---|---|
| Example 21 | 2100 | 80 | 2900 | 6 |
| Example 22 | 2100 | 70 | 3000 | 4 |
| Example 23 | 2300 | 88 | 2200 | 6 |
| Example 24 | 1500 | 20 | 300 | 50 |
| Comparative Example 1 | 500 | 20 | 20 | 80 |
| Comparative Example 2 | 1200 | 40 | 100 | 50 |
| Comparative Example 3 | 500 | 30 | 20 | 80 |
| Comparative Example 4 | 500 | 30 | 100 | 80 |
| Comparative Example 5 | 1000 | 50 | 200 | 60 |

As is apparent from Tables 1 to 6, the secondary batteries of Examples 1 to 24 are excellent in 25° C. discharge capacity and cycle life, as compared with Comparative Examples 1 to 5. As shown in Tables 3 and 4, in many cases, the pH of the first and second electrolytes is different from the value before charge, that is, after preparation of the aqueous solution and the value after 10 charge-and-discharge cycles. The secondary batteries of Examples 1 to 23 in which the pH value of the second electrolyte is higher than the pH value of the first electrolyte at least after the charge-and-discharge cycle are excellent in 25° C. discharge capacity, cycle life, high current discharge performance, and self-discharge performance at 45° C., as compared with the secondary battery of Example 24 in which the pH value of the second electrolyte is lower than the pH value of the first electrolyte value. One of the reasons why the performance of the secondary battery of Example 24 is not sufficient is that the oxygen generation amount on the positive electrode side is large. Note that a change in the pH value becomes small after the number of charge-and-discharge cycles exceeds 10 cycles, and the pH of the first and second electrolytes is kept substantially constant after 10 cycles. The reason why the pH of the second electrolyte of Example 1 is the same as the pH of the second electrolytes of Examples 10 to 18 is that the pH of the $Li[(FSO_2)_2N]$ aqueous solution is hardly affected by the lithium salt concentration.

From the comparison between Example 1 and Examples 14 to 18, it can be seen that high discharge capacity, excellent cycle life, high current discharge performance, and excellent 45° C. self-discharge performance of the battery can be obtained even when the kind of the positive electrode active material or the negative electrode active material is changed from Example 1.

The secondary battery of at least one embodiment or example includes a first electrolyte which is contained in at least a positive electrode and includes a first alkali metal salt and a first aqueous solvent, a second electrolyte which is contained in at least a negative electrode and includes a second alkali metal salt and a second aqueous solvent, and a separator which includes an alkali metal ion conductive solid electrolyte. Therefore, it is possible to provide a secondary battery which is excellent in discharge capacity, cycle performance, high current performance, and storage performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising:
   a positive electrode;
   a negative electrode;
   a separator provided at least between the positive electrode and the negative electrode and comprising an alkali metal ion conductive solid electrolyte;
   a first electrolyte contained in at least the positive electrode and comprising a first alkali metal salt and a first aqueous solvent; and
   a second electrolyte contained in at least the negative electrode and comprising a second alkali metal salt and a second aqueous solvent,
   wherein the first electrolyte is in contact with the separator, and
   wherein a pH value of the second electrolyte is higher than a pH value of the first electrolyte.

2. The secondary battery according to claim 1, wherein an alkali metal ion concentration of the second electrolyte is a value equal to or higher than an alkali metal ion concentration of the first electrolyte.

3. The secondary battery according to claim 1, wherein an anion of the second alkali metal salt of the second electrolyte comprises at least one ion selected from the group consisting of $Cl^-$, $OH^-$, $[(FSO_2)_2N]^-$, and $[(CF_3SO_2)_2N]^-$.

4. The secondary battery according to claim 1, wherein an anion of the first alkali metal salt of the first electrolyte comprises at least one ion selected from the group consisting of $Cl^-$, $NO_3^-$, $CO_3^{2-}$, and $SO_4^{2-}$.

5. The secondary battery according to claim 1, wherein the negative electrode comprises a titanium-containing oxide that allows alkali metal ions to be inserted and extracted.

6. The secondary battery according to claim 1, wherein the separator comprises a composite of the alkali metal ion conductive solid electrolyte and a polymer material.

7. The secondary battery according to claim 1, wherein the negative electrode comprises negative electrode active material particles capable of allowing lithium ions to be inserted and extracted.

8. The secondary battery according to claim 1, wherein the alkali metal ion conductive solid electrolyte is a lithium ion conductive solid electrolyte, the first alkali metal salt is a first lithium salt, and the second alkali metal salt is a second lithium salt.

9. The secondary battery according to claim 1, wherein the separator is not an anion conductor.

10. The secondary battery according to claim 1, wherein
    the negative electrode comprises a titanium-containing oxide that allows alkali metal ions to be inserted and extracted, and
    the positive electrode comprises at least one selected from the group consisting of lithium manganese composite oxide, lithium nickel composite oxide, lithium cobalt aluminum composite oxide, lithium nickel cobalt manganese composite oxide, spinel type lithium manganese nickel composite oxide, lithium manganese cobalt composite oxide, lithium nickel aluminum composite oxide, lithium cobalt composite oxide, lithium nickel cobalt composite oxide, lithium phosphate having an olivine structure, and fluorinated iron sulfate.

11. A battery pack comprising the secondary battery according to claim 6.

12. The battery pack according to claim 11, wherein the secondary battery is provided in plural, and the plural of secondary batteries are electrically connected in series, in parallel, or in combination of series connection and parallel connection.

13. The battery pack according to claim 11, further comprising a protective circuit and an external power distribution terminal.

14. A vehicle comprising the battery pack according to claim 11.

15. The vehicle according to claim 14, which comprises a mechanism configured to convert kinetic energy of the vehicle into regenerative energy.

* * * * *